United States Patent
Busser et al.

(10) Patent No.: US 11,750,333 B2
(45) Date of Patent: Sep. 5, 2023

(54) SYSTEM AND METHOD FOR LONG RANGE WIRELESS LOCAL AREA NETWORK COMMUNICATIONS

(71) Applicant: SR Technologies, Inc., Sunrise, FL (US)

(72) Inventors: Ryan Busser, Fort Lauderdale, FL (US); Olivia Fernandez, Boca Raton, FL (US); Graham K. Smith, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 73 days.

(21) Appl. No.: 17/494,999

(22) Filed: Oct. 6, 2021

(65) Prior Publication Data
US 2023/0121193 A1    Apr. 20, 2023

(51) Int. Cl.
*H04L 1/1812*  (2023.01)
*H04L 1/1867*  (2023.01)
*H04W 24/08*  (2009.01)
*H04W 74/08*  (2009.01)

(52) U.S. Cl.
CPC ........... *H04L 1/1816* (2013.01); *H04L 1/189* (2013.01); *H04L 1/1887* (2013.01); *H04W 24/08* (2013.01); *H04W 74/0816* (2013.01)

(58) Field of Classification Search
CPC ..... H04L 1/1816; H04L 1/1887; H04L 1/189; H04W 24/08; H04W 74/0816
See application file for complete search history.

(56) References Cited

U.S. PATENT DOCUMENTS

| | | | |
|---|---|---|---|
| 9,992,087 | B2 | 6/2018 | Smith |
| 2004/0190540 | A1 | 9/2004 | Miyake et al. |
| 2008/0123573 | A1 | 5/2008 | Jiang |
| 2011/0002402 | A1 | 1/2011 | Smith et al. |
| 2013/0148640 | A1 | 6/2013 | Li et al. |
| 2013/0176980 | A1 | 7/2013 | Kneckt et al. |
| 2016/0337219 | A1* | 11/2016 | Smith ................ H04L 1/16 |
| 2016/0345363 | A1 | 11/2016 | Ni et al. |

FOREIGN PATENT DOCUMENTS

EP    3361807 A1 *   8/2018   ............. H04B 7/086

* cited by examiner

*Primary Examiner* — Said M Elnoubi
(74) *Attorney, Agent, or Firm* — Christopher & Weisberg, P.A.

(57) ABSTRACT

A method in a monitoring station configured for communication with a wireless device is described. The method includes determining a round trip time, RTT, that corresponds to a first packet transmitted to the wireless device; receiving a second packet from the wireless device; determining the second packet from the wireless device has been received without error based at least in part on an error-detecting field; and receiving a subsequent packet from the wireless device. The method further includes determining that the subsequent packet received is a second packet retransmission; determining a preamble receipt time of the subsequent packet; determining a delay value based in part on the RTT of the first packet, the length field of the subsequent packet, and data rate field of the subsequent packet. The first acknowledgement packet is transmitted timed at the delay value after the preamble receipt time of the subsequent packet.

18 Claims, 13 Drawing Sheets

SYSTEM AND METHOD FOR LONG RANGE WIRELESS LOCAL AREA NETWORK COMMUNICATIONS

TECHNICAL FIELD

The present disclosure relates to wireless communications and in particular to a method and monitoring station for enabling efficient long range communications between a monitoring and a target wireless device while overcoming range limitations due to timeout intervals.

BACKGROUND

The present disclosure relates to communication between devices based upon the IEEE 802.11 technology commonly known as Wi-Fi. IEEE Standard 802.11-2020 ("Standard") is used as the reference for the specifications used in this disclosure. The standard exchange of packets between two stations (STAs), such as between a STA A and STA B, is for STA A to transmit a packet to STA B and then wait for the acknowledgment (ACK) packet to be received back from STA B before sending the next packet. In a standard infrastructure network, either STA A or STA B may be an access point (AP). Consider the case that STA A is an AP. After the AP has transmitted the packet to a STA, the AP will wait for a set timeout period that is dependent upon the channel frequency band and the physical data rate. If the ACK is not received within that timeout period, the AP will assume that the packet failed and will, in most cases, retry the transmission. In the case that successive transmissions of that packet do not receive an ACK within the specified timeout period, then the AP will retry the packet up to a retry limit and at that point discard the packet. If it is assumed that the packet was received error free at the STA, then as each packet is retried to the limit, the resultant throughput is a fraction of what it could be.

The aforementioned timeout period is specified in the Standard. The aforementioned timeout period is termed "ACKTimeout interval" and is defined as having a value as follows:
ACKTimeout=aSIFSTime+aSlotTime+aPHY-RX-START-Delay.

If the AP and the STA are co-operative then the AP and the STA can, in fact, according to the Standard, adjust their ACKTimeouts to accommodate a known long range. This may be done by adding "aPropagationTime" to the "aSlotTime" in the formula above. In a fixed long range link, with a known range, this is practical, i.e., the aSlotTime is extended, but for an unknown range this is impractical. In the case of the present disclosure, the AP does not know that the STA is far away and that the STA is attempting to communicate at a distance. It is noted that the use of the term "long range communications" throughout this disclosure may be defined as a range such that the propagation time of the signals between the AP and the STA exceeds the ACK-Timeout value when the aSlotTime is not adjusted for air propagation time.

The individual terms aSIFSTime, aSlotTime and aPHY-RX-START-Delay are specified in the Standard for each physical layer (PHY). For example, for a Clause 15 Direct Sequence Spread Spectrum (DSSS) device, 1 and 2 Mbps in the 2.4 GHz band, Table 15.5 in the Standard specifies aSIFSTime of 10 µs, aSlotTime of 20 µs and aPHY-RX-START-Delay of 192 µs. For a Clause 16 High Rate DSSS (HR/DSSS) device, 5.5 and 11 Mbps in the 2.4 GHz band, Table 16.4 in the 802.11 Standard specifies aSIFSTime of 10 µs, aSlotTime of 20 µs and aPHY-RX-START-Delay of "192 µs for long preamble and 96 µs for short preamble." Each transmission starts with a preamble and header which is detected by the receiving device in order to correctly identify that the transmission is indeed an 802.11 conformant signal and subsequently correctly demodulate the packet. It should be noted that the aPHY-RX-START-Delay durations, for Clause 15 and 16 devices, commonly known as 802.11b, are equal to the preamble and header duration. Also, it should be noted that, in general, the long preamble is used when the packet is being transmitted at a PHY rate of 1 Mbps, and the short preamble is used when the packet is being transmitted at 2, 5.5 or 11 Mbps.

When receiving a packet, the receiving Clause 15 or 16 device transmits the ACK after waiting a time period equal to aSIFSTime. If it is assumed that the distance between the AP and the STA, in the present example, is d feet, then the transmission from the AP will arrive at the STA after a delay of approximately d ns. The STA will wait aSIFSTime, e.g., 10 µs, and then transmit the ACK. The ACK transmission will also be delayed by d ns, and hence the AP will receive the ACK at a time (2d/1000+aSIFSTime) µs after the end of its packet transmission. Assuming that the packet transmitted by the AP is at 1 Mbps and hence uses the long preamble, the ACKTimeout interval will be equal to 10+20+192=222 µs which appears to allow for a value for d that equates to 212/2=106 µs, equal to a distance of about 20 miles. This, however, is not the case. The preamble and header duration is 192 µs, and, in theory, this must be completed before the end of the ACKTimeout interval in order for the AP to know that a valid ACK packet is being received. Hence, the start of the ACK must be received by the AP within only 20 µs after the end of its packet transmission. This would only allow a distance of less than 2 miles, which is restrictive for long range communications.

The preamble and header, for a long preamble, includes a 128-bit preamble, and a 16-bit start frame delimiter (SFD) followed by 48 header bits, a total of 192 bits, all sent at 1 Mbps. In practice, if the preamble is received within the ACKTimeout interval, then the AP may be able to recognize a valid signal and wait until the packet completes in order to establish that it is an ACK. In this case, the maximum delay would increase from 20 µs to (20+192−128)=84 µs, equivalent to a distance d of about 8 miles. Hence, in order that the ACK is received in time to prevent a retry, the maximum range of a 1 Mbps transmission, using a long preamble between the AP and STA, will be between 2 to 8 miles dependent upon the device specific implementation of the ACKTimeout interval. It should be noted that in the Standard, 1 Mbps and 2 Mbps devices may detect the presence of a signal by implementing either an energy detect above a threshold, or by detecting a valid DSSS signal. The energy detect threshold is set at −80 dBm according to the Standard, but in general, most 802.11b compliant devices use the valid signal detect, known as Carrier Sense (CS). Hence, it is necessary to detect the preamble bits and check that the valid DSSS code sequence is present.

The above background description is based upon the Clause 15 and Clause 16 PHY layers of the Standard. A similar situation is present for other PHY layers. If using the 2.4 GHz band, then it is also possible to use the orthogonal frequency division modulation (OFDM) of Clause 18 Extended Rate PHY (ERP), commonly referred to as 11g. Similarly, in the 5 GHz band, Clause 17 devices, commonly referred to as 11a, Clause 19 devices, commonly referred to as 11n, and Clause 19 devices, commonly referred to as 11ac, use OFDM. In the cases when OFDM is in use, the lowest PHY rate, and hence the PHY rate most likely to be used for long distance communication, is at 6 Mbps or possibly 6.5 Mbps. For 6 Mbps OFDM, the value for aSIFSTime, according to Table 18.5 of the Standard, is 10 μs. However, a signal extension of 6 μs is specified which causes the effective value for aSIFSTime to be 16 μs which will be used for the purposes of the background discussion related to this disclosure. The aSlotTime, is specified as either 20 μs or 9 μs, but in practice the 9 μs slot time is used. The aPHYRxSTARTDelay is also specified in Table 18.5 of the Standard and a value of 20 μs is given for OFDM. Hence, for a OFDM packet, the ACKTimeout interval is 16+9+ 20=45 μs. The duration of the OFDM header is 20 μs. An OFDM device is required to detect the presence of a signal and set a trigger, using both energy detect, i.e., any energy detected above a set threshold, and carrier detect, i.e., the receipt of a valid header which will be at the receive sensitivity level. The returning ACK to a transmitted packet must therefore be detected within 9+20=29 μs. The signal detect is specified as being set within 4 μs of the start of the reception, according to 19.4.7 of the 802.11 Standard, hence the maximum delay due to range will be (29−4)/2=12.5 μs, or about 2.5 miles. Similar parameters apply to devices under Clause 17 of the Standard, commonly known as 11a, and devices under Clauses 19 and 21 of the Standard, commonly known as 11n and 11ac, respectively.

FIG. 1 is a block diagram of a standard communications link 100 between an AP 101 and a STA 105 in a typical IEEE 802.11 infrastructure network. The distance between the AP 101 and the STA 105 is d 110. The propagation time for a radio signal between the AP 101 and STA 105 is d/C where C is the speed of light. If d is in feet, then the propagation time is about d ns. Assuming that a radio signal is transmitted by the STA 105, if the distance 110 between the AP 101 and STA 105 is 1 mile, the radio signal received at AP 101 will be delayed by 5.28 μs, referred to the time of the transmission from the STA 105.

FIG. 2 is a timing diagram that depicts the typical transmission of a packet from AP 101 to STA 105 in time. At time T1 211, AP 101 starts to transmit packet 202. At time T2 221 STA 105 starts to receive the packet 202. At time T3 212, AP 101 completes the transmission of packet 202 and at time T4 222, STA 105 completes receiving the packet 202. The time differences (T2−T1) and (T4−T3) are the same and have a value δ 231 that corresponds to the distanced 110 between the AP 101 and the STA 105, as previously described in FIG. 1. At time T5 223, STA 105 will transmit an acknowledgement packet (ACK) 221 back to the AP 101. The time difference (T5−T4), will be equal to the aSIFSTime as defined in the Standard which, as previously explained, is the time that a STA will wait after the completion of a received packet before sending an ACK packet in response. At time T6 213, AP 101 starts to receive the ACK packet 221. Note that the time difference δ 233, between T6 213 and T5 223, will again represent the propagation time between the AP 101 and the STA 105 and will be equal in value to δ 231. Hence, the time that elapses, at the AP 101, from the end of the transmission T3 212 of packet 202 to the start of the reception of the ACK packet 221 at time T6 213 is equal to (2δ+aSIFSTime), where δ is the propagation time related to the distance d 110 between the AP 101 and the STA 105 as previously described in FIG. 1. As previously described, if the distance, and hence the propagation time, exceeds a certain value, then the AP 101 will receive the ACK 221 too late and it will assume that the transmitted packet 202 failed. At this point the AP 101 will start proceedings to send a retry of packet 202.

FIG. 3 is a diagram that shows the format of an 802.11 DSSS or HR/DSSS 802.11 data packet. The preamble 307 consists of a synchronization field 301 followed by the Start Frame Delineator (SFD) 302. The synchronization field 301 consists of 128 bits in the case of the long preamble and 56 bits in the case of a short preamble. The preamble 307 is followed by the header 308 which includes the signal, service, and length fields 303 followed by a cyclic redundancy check (CRC) 304. After the CRC 304 comes the media access control (MAC) header 305 and frame body 306. At the end of the packet is the frame check sum (FCS) 310, which is used to check if the packet has been received with no errors. Referring back to FIG. 2, the time T4 222, the end of the received packet 202, is the point at which the FCS error check has been carried out successfully.

The short preamble can only be used if the MAC header 305 and packet frame body 306 is being sent at 2, 5.5 or 11 Mbps. The signal, service, and length fields 303 are also sent at 2 Mbps if the short preamble is used. For a 1 Mbps transmission, the long preamble is used. For a long preamble, together the preamble 307 and header 308 comprise 192 bits sent at 1 Mbps, hence the duration of the preamble and header is 192 μs. For a short preamble, together the preamble 307 and header 308 comprise 72 bits sent at 1 Mbps, hence the duration of the preamble and header is 72 μs.

FIG. 4 is a diagram that shows the format of an 802.11 OFDM transmitted packet for Clause 17 and 18 devices of the Standard commonly known as 11a and 11g, respectively. The preamble and signal 407 are transmitted at the 6 Mbps OFDM rate. The preamble 401 is 16 μs in duration and includes 12 symbols, 10 short and 2 long. The preamble 401 is followed by the signal field 402 which is a single symbol. After the preamble and signal 407 comes the service and MAC frame 408 comprised of the service field 403, the MAC header 404, the frame body 405, and finally the FCS 406. The service and MAC frame 408 is transmitted at the chosen data rate for the packet. The preamble and signal 407 are sent at 6 Mbps. For Clause 19 and 21 devices of the Standard, commonly known as 11n and 11ac, the transmitted packet starts with the same preamble and signal 407, but extra preamble and signal fields are included before the service and MAC frame 408. The detection of the preamble and signal 407 signifies that a packet is being received.

The FCS field is used to verify that the packet has been received correctly. If in a received packet the FCS check is correct then the ACK should be sent. If the FCS check fails, then an ACK is not sent. Therefore, the point at which a device knows that a packet has been received, and that it is correct, is at the end of the packet after checking the FCS field. Also, it should be noted that the ACK packet is not transmitted until a time of aSIFSTime has elapsed after the end of the received packet. This is to allow time for the transmitting device to switch from transmit mode to receive mode in order to receive the ACK. When the AP and the STA are close, then the aSIFSTime is the elapsed time between the end of the transmitted packet and the start of the received ACK packet. If the AP and the STA are at a distance from each other, then the time between the end of the transmitted packet and the start of reception of the received ACK packet will be greater. Hence, the ACKTimeout interval is used to allow the transmitting station to wait for the ACK but not wait too long in the case that the ACK is not being sent. This restriction on the ACKTimeout interval is a limitation on efficient communications over extended ranges.

FIG. 5 and FIG. 6 describe a known method for estimating the time delay and hence the distance between two stations.

The method described does not in itself form part of this disclosure, but the use of the method of measuring the delay and then using the result of the measurement to improve the communication at extended range does form part of this disclosure.

FIG. 5 is an example timing diagram that describes a basic active ranging method that may be used to determine the distance between a STA 105 and AP 101. The time axis 510 refers to STA 105 and the time axis 520 refers to AP 101. At time T1 511, STA 105 transmits a packet to AP 101. The transmission of packet 512 is received at AP 101 at time T2 513. The propagation time of the transmission of packet 512 is (T2−T1) 530. AP 101 transmits a response 524 at time T3 523. The time 522 that has elapsed between the reception of the packet at time T2 513 and the transmission at time T3 523 is the turnaround time at AP 101. Ideally the turnaround time 522 at AP 101 will be equal in duration to aSIFSTime (SIFS). For example, if the first transmitted packet 512 is a ready-to-send (RTS) control packet, then response 524 will be a clear-to-send (CTS) control response packet. If, for example, packet 512 is a data or data null packet then the response 524 will be an ACK packet. A variety of packets may be used, however, the nominal turnaround time 522 for the response packet is known. At time T4 514, STA 105 receives the response 524 from AP 101. The propagation time of the transmission of the response 524 is (T4−T3) 534. It should be noted that the time differences 530 and 534 represent the propagation time, δ, of the transmissions and should be equal assuming the distance between the two stations has not changed. The total time that elapses between the transmission of packet 512 and the reception of the response 524 at STA 105, T4−T1, is:

$$(T2-T1)+(T3-T2)+(T4-T3)=(T4-T1)=\delta+SIFS+\delta \quad (5)$$

$$\text{Hence, } \delta=(T4-T1-SIFS)/2 \quad (6)$$

Expression (6) is a simplified equation that provides an understanding of the general idea of a ranging transmission method. Note, however, that the durations of the transmitted packet 512 and the response packet 524 are not accounted for in equation (5). Note also that, in practice, it is common that the timestamp of a packet is set to coincide with the end of the packet at the point where the FCS check is completed.

FIG. 6 is an example time diagram that describes in further detail a general ranging transmission method as discussed above with reference to FIG. 5. Time axis 610 refers to STA 105 and time axis 620 refers to AP 101. At time Ta 611 STA 105 starts the transmission of packet 512 which is addressed to AP 101. After a delay of δ, at time Tb 621, AP 101 starts to receive packet 512. At time Tc 612 STA 105 completes the transmission of packet 512 and at time Td 622 AP 101 completes the reception of packet 512. The time difference between Tc 612 and Td 622 is δ, the propagation time for the packet to travel from STA 105 to AP 101. Note that the time differences (Tc−Ta) and (Td−Tb) are both the duration tp 630 of the transmitted packet 512.

AP 101 transmits the response packet 524 at time Te 623. Assuming that the response is an ACK or an RTS packet in reply to the received packet 603, time Te ideally will be at a time $t_{SIFS}$ 632 after time Td 622, where $t_{SIFS}$ 632 is the aSIFSTime as defined in the Standard. At time Tf 613, STA 105 starts to receive the response 524. At time Tg 624 AP 101 completes the transmission of the response 524 and at time Th 614, STA 105 completes receiving the response 524. Note that the time differences (Tb−Ta), (Td−Tc), (Tf−Te) and (Th−Tg) are all equal and have the value δ which is the propagation time for the packet and response to travel between the AP 101 and STA 105. At STA 105, the time of a packet at the point when the frame check has completed may be recorded. Hence, at STA 105 the time for the transmission of packet 512 that is recorded is Tc 612, and the time that is recorded for the reception of the response 524 is Th 614. In order to calculate the value of δ, it is necessary to know the length Tr 634 of the response packet 524. Length Tr 634 can be determined from details of the response packet rate and length fields. In practice therefore, STA 105 can calculate the value of δ from expression (7):

$$\delta=(Th-Td-Tr-t_{SIFS})/2 \quad (7)$$

FIG. 7 is an example diagram that further demonstrates the times associated with the sending of an IEEE 802.11 packet 700 using conventional timing. Packet 700 is transmitted by AP 101 at time T11 740. At time T12 741, STA 105 starts to receive packet 700. For example, packet 700 is a data packet transmitted at 1 Mbps on a 2.4 GHz channel. Time difference (T12−T11) is the propagation delay. The transmitted packet 700 starts with the preamble 307, followed by the header field 308, the MAC header 305, the frame body 306 and finally the FCS field 310. At time T13 742, the AP 101 completes the transmission of the packet 700. At STA 105, the reception time T14 743 of packet 700 is after the completion of the FCS 310. Time difference (T14−T13) is also the propagation delay, equal to (T12−T11). At time T15 744, STA 105 transmits the ACK packet 720 addressed to the AP 101. The time difference (T15−T14) is nominally equal to aSIFSTime. At time T16 745, AP 101 starts to receive the ACK packet 720. Time difference (T16−T15) is the propagation delay, equal to (T12−T11) and (T14−T13). At time T17 746 the receipt of the preamble of the ACK packet 720, is completed.

The time difference (T17−T13) represents the time that has elapsed at the AP 101 after having completed the transmission of packet 700 and receiving, or identifying the receipt of the expected ACK packet. To illustrate the timing, the following example is used. For example, assuming a distance between the AP 101 and the STA 105 of 19 miles, the corresponding propagation delay is about 100 μs. A 1000-byte packet at 1 Mbps is 8816 μs duration in total. The duration of a 1 Mbps ACK packet is 304 μs of which the preamble is 128 μs duration. Continuing the example, assuming that aSIFSTime was used by the STA 105, then the delay (T17−T13) has a value of 100+10+100+128=338 μs. This exceeds the ACKTimeout interval of 222 μs, and, therefore, the AP 101 will have assumed that the packet 700 was not received and will proceed to retry the packet. There is every chance that the AP 101 will already be re-transmitting the packet 700 when the ACK 720 is present at the AP 101 antenna, but even if the ACK 720 is received at this late time, the AP 101 will not know the source and will disregard it. It should be noted that ACK packets do not include the address of the originating station and only include the destination address.

In the case that a STA is attempting to establish long range communication with a standard AP such that the STA can receive from and transmit to the AP, the ACKTimeout interval used by the AP is assumed to be that in the Standard. Hence, when attempting long range Wi-Fi communications, a timeout of the device waiting for the ACK may occur.

SUMMARY

According to an aspect of the present disclosure, a method in a monitoring station configured for communication with a wireless device is described. The method includes determining a round trip time, RTT, of a plurality of RTTs, the RTT corresponding to a first packet transmitted by the monitoring station to the wireless device; receiving a second packet from the wireless device, where the second packet includes at least an error-detecting field; determining the second packet from the wireless device has been received without error based at least in part on the error-detecting field; and receiving a subsequent packet from the wireless device, where the subsequent packet includes at least a preamble and a header field, and the preamble includes at least a length field and a data rate field. The method further includes determining that the subsequent packet received from the wireless device is a retransmission of the second packet based at least in part on the header field; determining a preamble receipt time corresponding to an end of the preamble of the subsequent packet; determining a delay value between the preamble receipt time and a transmission of a first acknowledgement packet in response to the subsequent packet based in part on the RTT corresponding to the first packet, the length field of the subsequent packet, and data rate field of the subsequent packet. The first acknowledgement packet is transmitted to the wireless device timed at the delay value after the preamble receipt time of the subsequent packet.

In some embodiments, the first packet transmitted by the monitoring station to the wireless device is any one of an authentication request, an association request, and one handshake message of a plurality of handshake messages. The second packet is received in response to the first packet and is one of an authentication response, an association response, and another handshake message of the plurality of handshake messages.

In some other embodiments, the method further includes exchanging a plurality of data packets with the wireless device after the monitoring station completes an association with the wireless device, where the plurality of data packets includes at least one uplink data packet and one subsequent downlink data packet. The delay value is dynamically adjusted by determining another RTT of the plurality of RTTs for each uplink data packet of the plurality of data packets, The other RTT is used for the determination of the delay value of the subsequent packet, and the subsequent packet is the subsequent downlink data packet.

In one embodiment, the delay value is a first delay value. After receiving the second packet from the wireless device, if the received second packet is a request-to-send, RTS, packet, the method further includes determining another preamble receipt time, where the other preamble receipt time is an RX_START time corresponding to an end of a preamble of the RTS packet; determining a second delay value based at least in part on the RTT corresponding to the first packet, a length field of the RTS packet and a data rate field of the RTS packet; and transmitting a second acknowledgement packet to the wireless device timed at the delay value after the RX-START time corresponding to the end of the preamble of the RTS packet. The second acknowledgement packet is a clear-to-send, CTS, packet.

In another embodiment, the delay value is further based on a Short Interframe Space, SIFS, between and end of a transmission of the subsequent packet and a start of a reception of a corresponding acknowledgement packet. The method further includes, if the second packet from the wireless device is not the RTS packet and the RTT is one of equal to and greater than the SIFS, determining a third delay value to transmit a third acknowledgement packet to the wireless device after an end of the second packet including the at least the error-detecting field, and transmitting the third acknowledgement packet.

In some embodiments, if the subsequent packet being received from the wireless device is not the retransmission of the second packet, a fourth acknowledgement packet is transmitted in response to the subsequent data packet after a time equal to a Short Interframe Space, SIFS, has elapsed from an end of reception of the subsequent data packet.

In some other embodiments, the RTT is determined as:
RTT=(RX_START−TX_START)−SIFS−L, where RX_START is a time corresponding to an end of a preamble of another packet received in response to the first packet transmitted by the monitoring station, TX_START is a time that the first packet was transmitted by the monitoring station, SIFS is an aSIFSTime, and L is a time corresponding to a total packet length.

In one embodiment, the delay value is determined as:
delay=mac_time+SIFS−RTT, where mac_time is a time corresponding to a frame body and an error-detection field of the subsequent packet. The mac_time is calculated based at least in part on the length field of the subsequent packet and the data rate field of the subsequent packet, SIFS is an aSIFSTime, and RTT is the RTT.

In another embodiment, the error-detecting field is a Frame Check Sum, FCS, field, and the preamble receipt time is an RX_START time corresponding to the end of the preamble of the subsequent packet received from the wireless device.

In some embodiments, the wireless device is an Access Point configured at least for any one of an authentication of the wireless device, an association to the wireless device, a handshake process, and an exchange of data packets with the wireless device.

According to another aspect of the present disclosure, a monitoring station configured for communication with a wireless device is described. The monitoring station includes processing circuitry configured to determine a round trip time, RTT, of a plurality of RTTs, where the RTT corresponds to a first packet transmitted by the monitoring station to the wireless device; cause the monitoring station to receive a second packet from the wireless device, where the second packet includes at least an error-detecting field; determine the second packet from the wireless device has been received without error based at least in part on the error-detecting field; and cause the monitoring station to receive a subsequent packet from the wireless device, where the subsequent packet includes at least a preamble and a header field. The preamble includes at least a length field and a data rate field. The processing circuitry is further configured to determine that the subsequent packet received from the wireless device is a retransmission of the second packet based at least in part on the header field; determine a preamble receipt time corresponding to an end of the preamble of the subsequent packet; and determine a delay value between the preamble receipt time and a transmission of a first acknowledgement packet in response to the subsequent packet based in part on the RTT corresponding to the first packet, the length field of the subsequent packet, and data rate field of the subsequent packet; and cause the monitoring station to transmit the first acknowledgement packet to the wireless device timed at the delay value after the preamble receipt time of the subsequent packet.

In some embodiments, the first packet transmitted by the monitoring station to the wireless device is any one of an authentication request, an association request, and one handshake message of a plurality of handshake messages. The second packet is received in response to the first packet and is one of an authentication response, an association response, and another handshake message of the plurality of handshake messages.

In some other embodiments, the processing circuitry is further configured to cause the monitoring station to exchange a plurality of data packets with the wireless device after the monitoring station completes an association with the wireless device. The plurality of data packets includes at least one uplink data packet and one subsequent downlink data packet. The processing circuitry is also configured to dynamically adjust the delay value by determining another RTT of the plurality of RTTs for each uplink data packet of the plurality of data packets. The other RTT is used for the determination of the delay value of the subsequent packet. The subsequent packet is the subsequent downlink data packet.

In one embodiment, the delay value is a first delay value. The processing circuitry is further configured to, after receiving the second packet from the wireless device, if the received second packet is a request-to-send, RTS packet, determine another preamble receipt time, where the other preamble receipt time is an RX_START time corresponding to an end of a preamble of the RTS packet; determine a second delay value based at least in part on the RTT corresponding to the first packet, a length field of the RTS packet and a data rate field of the RTS packet; and cause the monitoring station to transmit a second acknowledgement packet to the wireless device timed at the delay value after the RX-START time corresponding to the end of the preamble of the RTS packet. The second acknowledgement packet is a clear-to-send, CTS, packet.

In another embodiment, the delay value is further based on a Short Interframe Space, SIFS, between and end of a transmission of the subsequent packet and a start of a reception of a corresponding acknowledgement packet. The processing circuitry is further configured to, if the second packet from the wireless device is not the RTS packet and the RTT is one of equal to and greater than the SIFS, determine a third delay value to transmit a third acknowledgement packet to the wireless device after an end of the second packet including the at least the error-detecting field; and cause the monitoring station to transmit the third acknowledgement packet.

In some embodiments, the processing circuitry is further configured to, if the subsequent packet being received from the wireless device is not the retransmission of the second packet, cause the monitoring station to transmit a fourth acknowledgement packet in response to the subsequent data packet after a time equal to a Short Interframe Space, SIFS, has elapsed from an end of reception of the subsequent data packet.

In some other embodiments, the RTT is determined as:
RTT=(RX_START−TX_START)−SIFS−L, where RX_START is a time corresponding to an end of a preamble of another packet received in response to the first packet transmitted by the monitoring station, TX_START is a time that the first packet was transmitted by the monitoring station, SIFS is an aSIFSTime, and L is a time corresponding to a total packet length.

In one embodiment, the delay value is determined as:
delay=mac_time+SIFS−RTT, where mac_time is a time corresponding to a frame body and an error-detection field of the subsequent packet, where the mac_time is calculated based at least in part on the length field of the subsequent packet and the data rate field of the subsequent packet, SIFS is an aSIFSTime, and RTT is the RTT.

In another embodiment, the error-detecting field is a Frame Check Sum, FCS, field, and the preamble receipt time is an RX_START time corresponding to the end of the preamble of the subsequent packet received from the wireless device.

In some embodiments, the wireless device is an Access Point configured at least for any one of an authentication of the wireless device, an association to the wireless device, a handshake process, and an exchange of data packets with the wireless device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
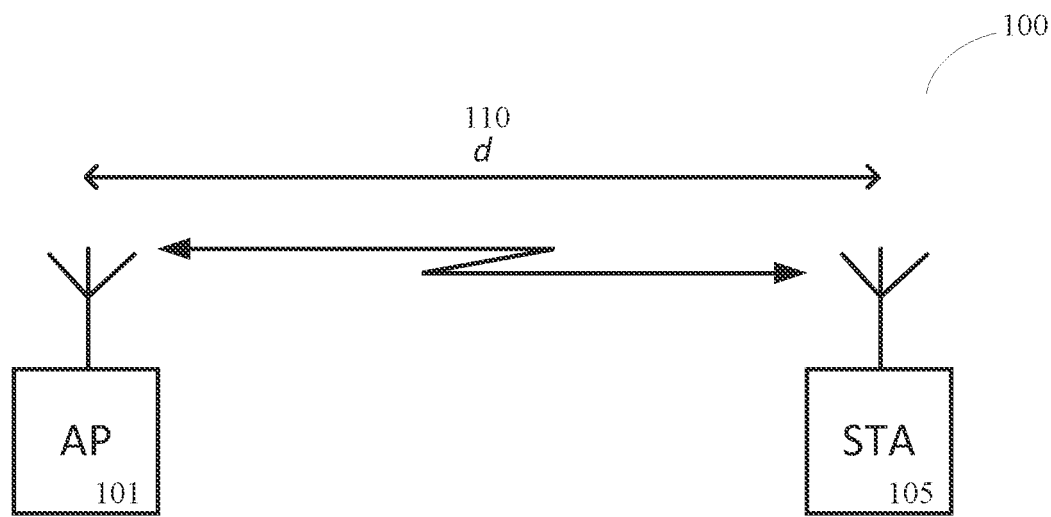
FIG. 1 is a block diagram of a standard communications link between an AP and a STA in a typical IEEE 802.11 infrastructure network.
Figure 2:
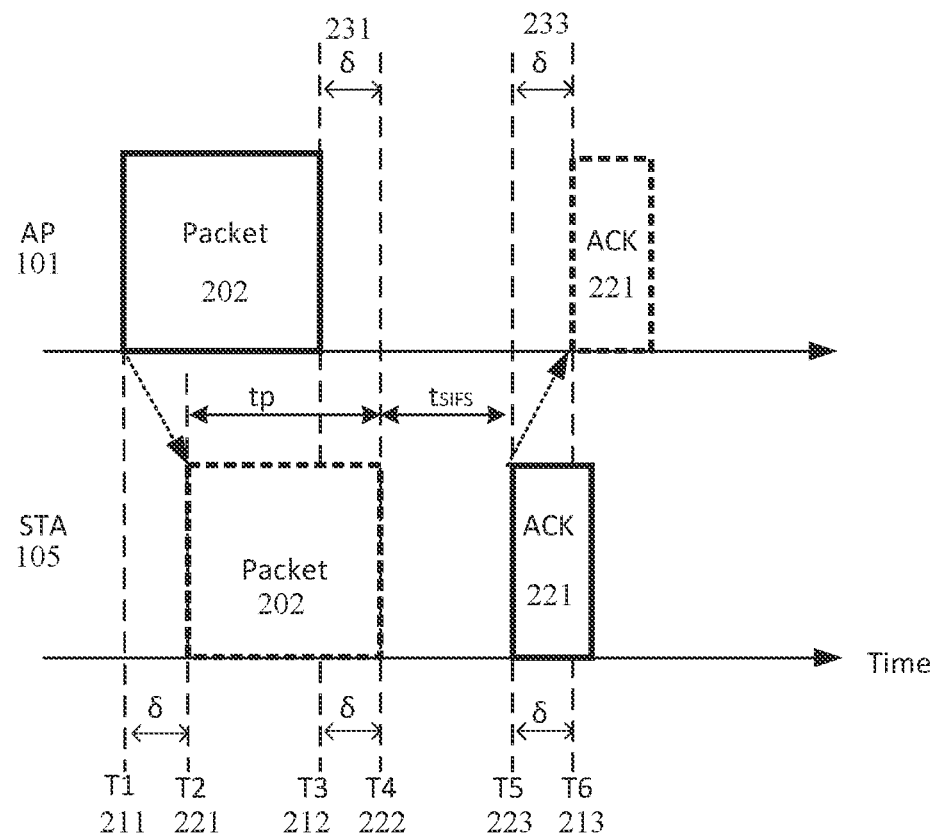
FIG. 2 is a timing diagram that depicts the typical transmission of a packet from AP to STA in time.

This Application incorporates U.S. Pat. No. 9,992,087 B2, June 2018, by reference in its entirety.

This disclosure describes communication over extended ranges with devices that are based upon the IEEE 802.11 technology, commonly known as Wi-Fi. This disclosure further describes extended range communication from a monitoring device to a legacy target device. The legacy target device may be one that complies with the IEEE 802.11 Standard, generally known as Wi-Fi, e.g., the device is not modified in any way for extended range communications. The monitoring device may be a device that generally complies with the 802.11 Standard but has been modified, as described in this disclosure, e.g., so as to enable extended range communications with the target device. Although the embodiments disclosed herein relate to Wi-Fi communications, the disclosure is not limited to only Wi-Fi communications, and may be applied to any other type of communications between wireless devices.

In some embodiments, methods to overcome the range limit imposed by the ACKTimeout interval are described. Also, methods that enable the monitoring Wi-Fi device to communicate at extended ranges with a legacy target Wi-Fi device are described. The legacy target device may be a device such as a station (STA) or an access point (AP). In the following description, the target legacy device is described as an AP. Describing the target device as an AP represents a particular use case used in order to aid in the descriptive process. However, the disclosure is not limited solely to the target device being an AP and may be any kind of wireless device.

As discussed above, in compliance with the 802.11 Standard, the ACK packet is not transmitted until a time of aSIFSTime has elapsed after the reception of a data packet. However, according to embodiments disclosed herein, when at extended range, the ACK may be sent as quickly as possible after confirmation that the received packet is correct and hence effectively reduce the delay of the ACK being received and, as such, increase the communication range. As also described herein, in another embodiment, the range, and hence the time delay between the devices is established for any uplink transmissions. The range and/or the time delay between the devices may be used as the basis for calculating the time that an ACK needs to be sent in order to be received in a timely manner, thereby preventing and/or reducing retries for subsequent uplink packet(s).

As previously explained, according to the Standard, the ACK packet is not transmitted until a time of aSIFSTime, Short Interframe Space (SIFS), has elapsed after the completion of the received packet. The value of the SIFS allows a minimum time for the transmitting device to switch from transmit mode to receive mode in order to receive the ACK. When at extended range, however, there is no need to wait for the full SIFS. The ACK may be sent after confirmation that the received packet is correct. For example, for an IEEE 802.11b compliant communication, if the ACK was sent 2 µs after the completion of the received packet, instead of waiting for 10 µs as typically required, an effective increase of range of about 0.75 miles is attained. In the case of an OFDM communication, where the SIFS is 16 µs, a reduction of 14 µs in the delay in sending the ACK would result in a range increase of 1.32 miles. For further increases in range, however, the ACK may need to be sent before the completion of the received packet.

In one embodiment, the range between the devices and hence the propagation time delay are determined, and then the determination used as the basis for calculating the time that a response packet, e.g., an ACK or a clear-to-send CTS (in response to a request-to-send RTS), takes to be sent in order to be received correctly and prevent further retries. At extended ranges, the response packet (e.g., ACK or CTS) to be sent by the monitoring STA in response to a packet being received from the target AP should be sent by the monitoring STA before the packet being received has completed (i.e., before the FCS check has been carried out). In addition, only a packet that has been received without errors should be acknowledged. Hence, in one embodiment, the packet is initially received and the FCS field checked. Then, if the packet was received without error, a response packet is sent to the subsequent retry of that packet, the response packet being sent before the retry packet has been received in its entirety. In order to calculate the time when the response packet is to be sent such that the response packet is received in time at the target AP, the monitoring STA, determines that the packet being received is indeed the expected retry packet. Then, the monitoring STA uses the time delay previously established based upon a timing trigger based upon a reliable time point within the initial portion of the received packet.

Figure 3:
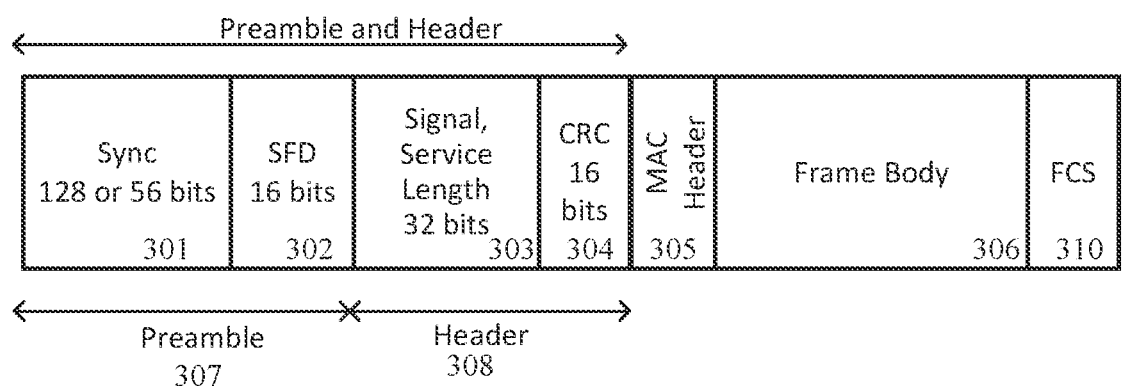
FIG. 3 is a diagram that shows the format of an 802.11 DSSS or HR/DSSS 802.11 data packet.
Figure 4:
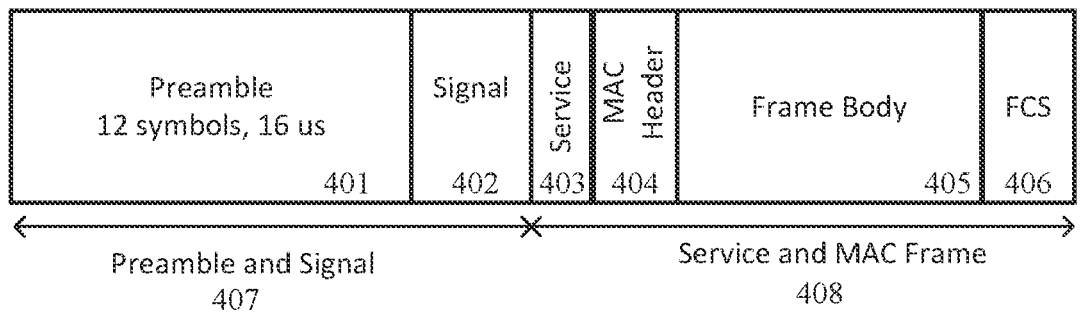
FIG. 4 is a diagram that shows the format of an 802.11 OFDM transmitted packet for Clause 17 and 18 devices of the Standard, commonly known as 11a and 11g, respectively.
Figure 8:
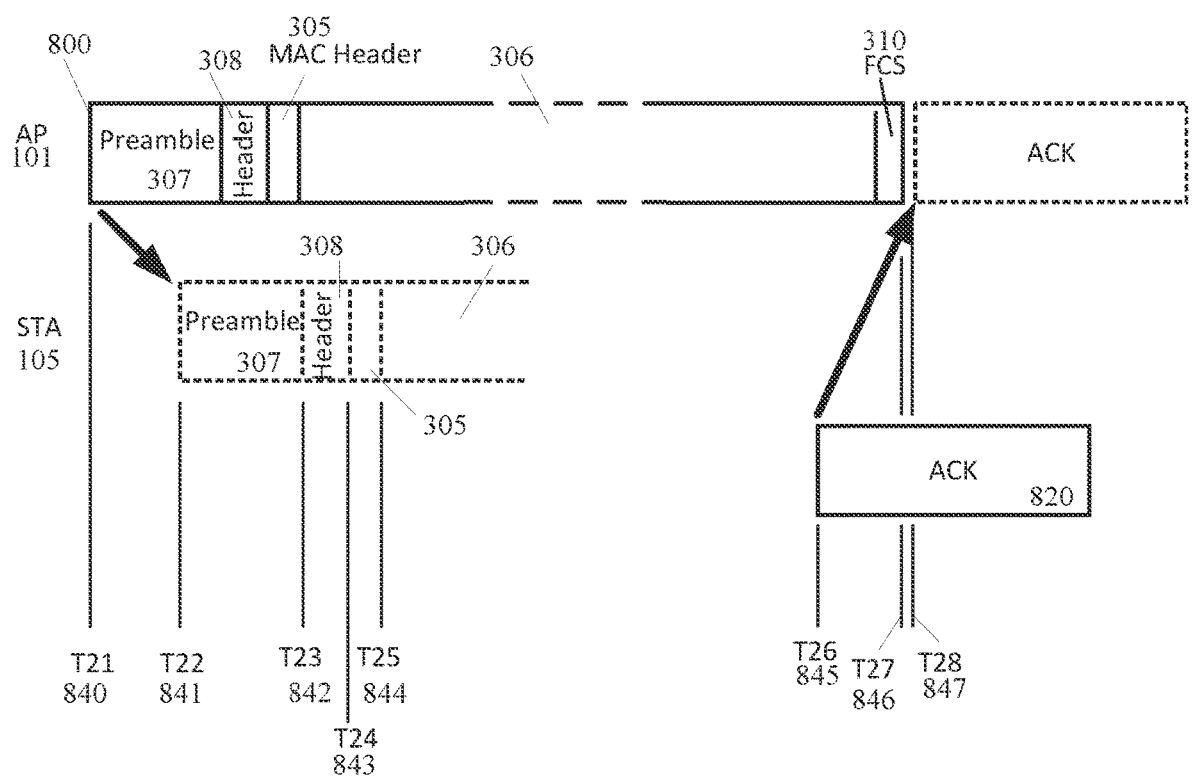
FIG. 8 is a diagram that shows the times associated with the transmission of an 802.11 packet and the response according to the principles of the present disclosure.

FIG. 8 is an example diagram that shows times associated with the transmission of an uplink IEEE 802.11 data packet, i.e., packet 800, and the response according to an embodiment of this disclosure. The packet 800 is transmitted by the AP 101 at time T21 840. At time T22 841, the STA 105 starts to receive packet 800. Also, for this example, the packet is a 1000-byte data packet being transmitted at 1 Mbps on a 2.4 GHz channel. Time difference (T22–T21) is the propagation delay. The transmitted packet 800 starts with the preamble field 307, followed by the header field 308, the MAC header 305, the frame body 306, and finally the FCS field 310. At time T23 842 the STA 105 receives the end of the preamble 307, and at time T24 843 the STA 105 receives the end of the header field 812. The preamble field may be referred to as a preamble. Similarly, the header field may be referred to as a header. At time T25 844, the STA 105 receives the end of the MAC header field 305. As discussed above with respect to FIGS. 3 and 4, at the end of the header field there is a CRC check, and hence the validity of the signal, service, and length fields can be verified. At the end of the MAC header field 305, the STA 105 can verify that the address fields present in the MAC header indicate that the packet originated from AP 101 and is addressed to STA 105. The STA 105 can examine the sequence number of the packet, also in the MAC header. Furthermore, the STA 105 can verify that the packet is a retry by examining the retry bit in the frame control field of the MAC header.

Figure 5:
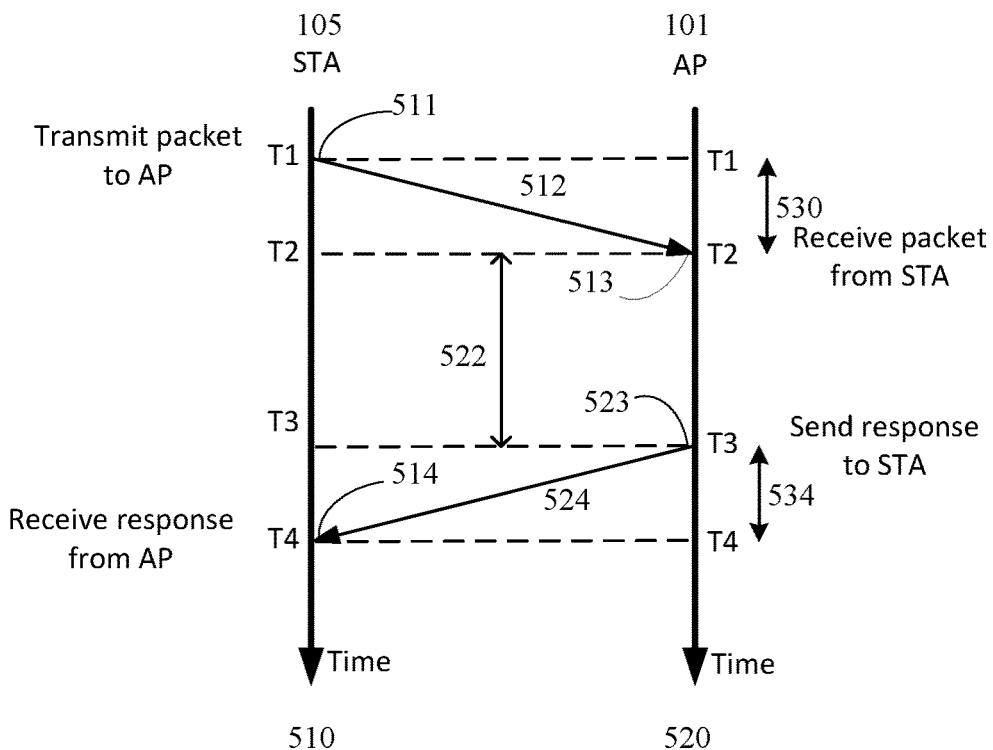
FIG. 5 is an example timing diagram that describes a basic active ranging method that may be used to determine the distance between a STA and AP.
Figure 6:
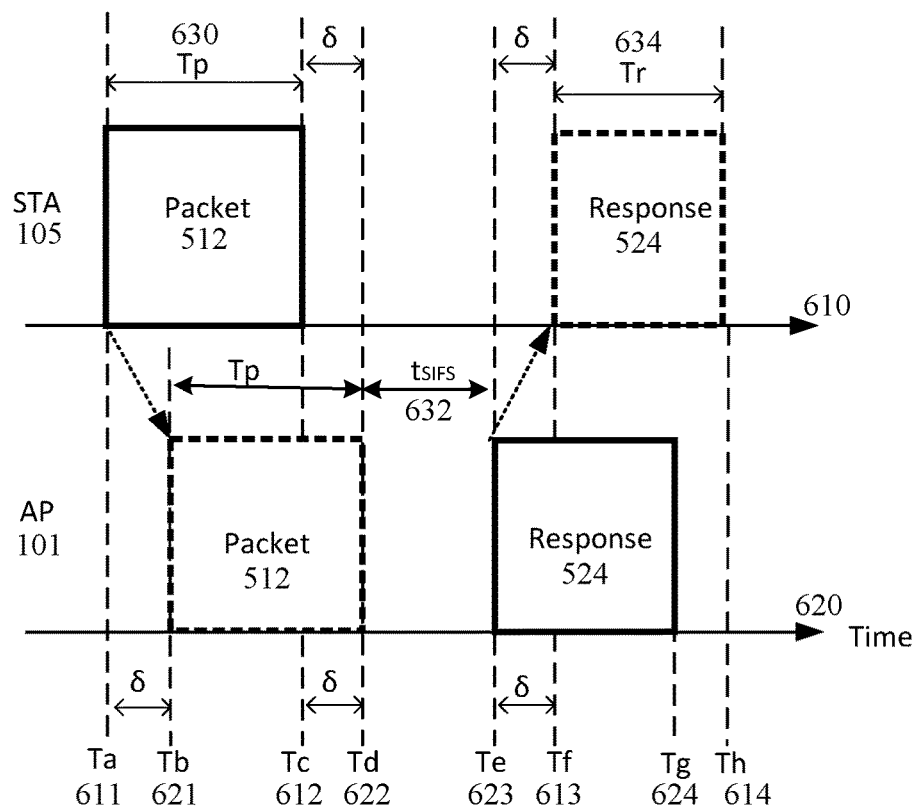
FIG. 6 is an example time diagram that describes in further detail a general ranging transmission method.

In one embodiment, a packet is desired to be first received without error. Referring back to FIG. 7, assume that the case of the first attempt by the AP 101 to transmit a packet, 700, is represented. In this example, the AP 101 assumes that the packet failed because the AP 101 did not receive the ACK 720 in time. However, in the example shown in FIG. 7, STA 105 did receive the packet without error. Now assume that FIG. 8 represents the case where the AP 101 is sending the retry packet, i.e., packet 800 is the retry of packet 700. Hence, at time T25 844, the STA 105 knows that the received packet is addressed to itself, the received packet is a retry, and that the sequence number indicates that the received packet has the same frame body 306 as the previously received packet. In this case, STA 860 need not receive the rest of the packet 810 as the content of the frame body 306 is known. Assume also that the packet delay (T22–T21) has already been estimated as described with reference to FIG. 5 and FIG. 6. Therefore, at time T25 844, STA 105 can drop the reception of the packet 800 and prepare for the transmission of the ACK packet 820 at time T26 845. At time T26 845, STA 105 transmits the ACK packet 820. At time T27 846, the AP 101 completes the transmission of the retry packet, i.e., packet 800. Because STA 105 has already started to send the ACK packet 820 at time T26 845, the ACK packet 820 is received at time T28 847 at a time that is calculated by STA 105, such that (T28–T27) is nominally aSIFSTime or between aSIFSTime and aSIFSTime plus aSlotTime. Thus, the AP 101 experiences the reception of a timely ACK 820 to the transmitted packet 800, i.e., a retry packet. Therefore, the AP 101 may note the successful transmission and/or not attempt to send any additional retries.

Figure 7:
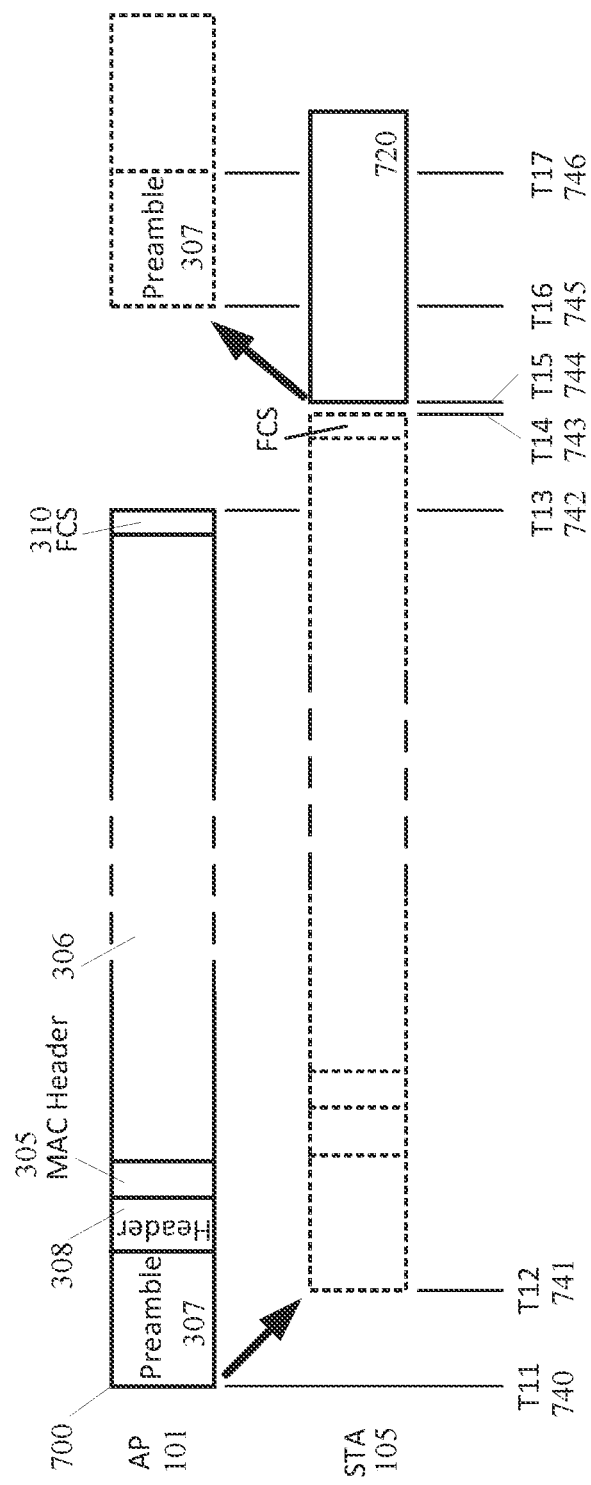
FIG. 7 is an example diagram that further shows the times associated with the sending of an IEEE 802.11 packet using conventional timing.

A method used by STA 105 to calculate the time to start sending the ACK 820 is described using the same nonlimiting example described with reference to FIG. 7. In this nonlimiting example, the distance between the AP 101 and the STA 105 is assumed to be 19 miles, which corresponds to a propagation delay of about 100 µs. Packet 800 is a 1000-byte packet at 1 Mbps which has a duration of 8816 µs duration in total. The preamble and header is 192 µs, the MAC header is generally 26 octets which is 208 µs in duration. All of these values are known by the STA 105. It should be noted that, even in the case where the retry packet is transmitted using a different data rate than the first packet, the information provided in the preamble and header field allows to calculate the duration of the packet. In this nonlimiting example, T22 841 is 100 µs after the start of the packet 800 transmission at T21 840. Time T25 844 will be 192+208=400 µs after time T22 841. At time T25 844 STA 105 has verified that this is indeed the desired retry packet. STA 105 knows that the packet 800 will finish transmission at time T27 846 which is 8816–100–400=8316 µs after STA 105 has verified the end of the MAC header 305 at time T25 844. STA 105 also knows that there will be a delay of 100 µs for the ACK packet 820 to reach the AP 101. STA 105 may start sending the ACK packet 820 at time T26 845 where (T26–T25)=8816–100–400–100+10=8226 µs. Therefore, the following times may correspond to FIG. 8: T21=0, T22=100 µs, T25=500 µs, T26=8726 µs, T27=8816 µs and T28=8826 µs. Hence, the ACK packet 820 arrives at AP 101 10 µs after the end of packet 800, a time equal to aSIFSTime. The time for the STA 105 to generate the ACK 820 to a packet 800, i.e., a retry packet, can be readily calculated so as to arrive at the AP 850 at the correct time. Although some implementations of devices have been observed to not use an accurate aSIFSTime, a variation of a few microseconds will not cause the generated ACK to arrive too late. Indeed, the calculation may be based on aSIFSTime plus a predetermined amount of time, e.g., 5 µs to cover the case where a device may be using an incorrect aSIFSTime.

Figure 9:
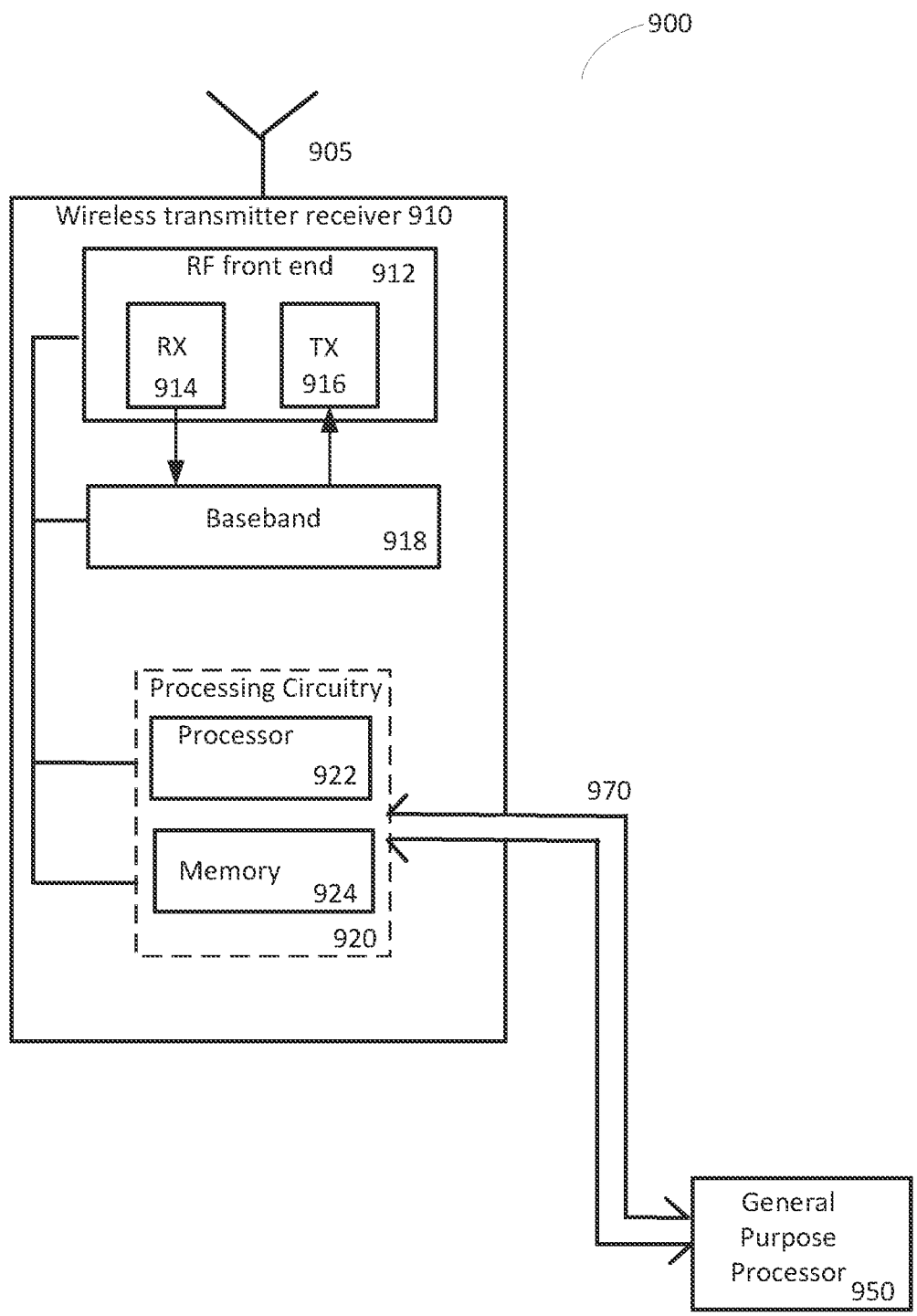
FIG. 9 illustrates a block diagram of an example monitoring station according to the principles of the present disclosure.

FIG. 9 illustrates a block diagram of an example monitoring station 900. Monitoring station 900, according to an embodiment of the disclosure, may be used as the STA 105 as discussed above with reference to FIGS. 1, 2, 5, 6, 7, and 8. The monitoring station 900 may be a device capable of wirelessly receiving signals and transmitting signals and may be configured to execute any of the methods of the Standard. Monitoring station 900 may be one or more stations, access points, or any other type of wireless device. The example monitoring station 900 includes one or more antennas 905, a wireless transmitter receiver 910, and/or a processor 950, e.g., a general-purpose processor, which may be interconnected to the wireless transmitter receiver 910, e.g., by a data bus 970.

In some embodiments, the monitoring station 900 includes one or more antennas 905, radio frequency (RF) front end 912 that includes wireless receiver 914 and wireless transmitter 916, baseband 918, and processing circuitry 920 that includes processor 922 and memory 924. In some embodiments one or more antennas 905 are connected to wireless transmitter 916 and wireless receiver 914. The wireless transmitter 916 may perform the usual functions of a transmitter front end such as up conversion, filtering, and/or amplification of modulated signals, e.g., inputted from the baseband 918 suitable for transmission via antenna 905. Wireless receiver 914 may perform as a receiver front end and may provide low-noise amplification, filtering, and/or frequency down conversion, suitable for inputting to baseband 918. Baseband 918 may perform a baseband process, such as bit ordering, scrambling, and/or modulation suitable for inputting to wireless transmitter 916, and de-modulation, de-scrambling, and/or de-coding of the signal received from wireless receiver 914.

In some embodiments, the processing circuitry 920 and/or the processor 922 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments, some functions of the baseband 918 may be performed by the processing circuitry 920. The processing circuitry 920 may be configured to control any of the methods and/or processes described herein and/or to cause such methods, and/or processes to be performed, e.g., by the baseband 918, wireless transmitter 916 and wireless receiver 914. The memory 924 may be configured to store data, programmatic software code and/or other information described herein. In some embodiments, the software may include instructions that, when executed by the processing circuitry 920, causes the processing circuitry 920 to perform the processes described herein with respect to the baseband 918, wireless transmitter 916 and wireless receiver 914.

According to this embodiment of the disclosure, the monitoring station 900 is arranged to receive input signals and the processing circuitry 920 is arranged to measure and monitor an input signal's attributes, including but not limited to the preamble 307 or 401, header 308 or signal field 402, and MAC header 305 or 404, e.g., according to the Standard. Also, the monitoring station 900 is arranged to receive input signals, and the processing circuitry 920 is arranged to measure and/or monitor input signal attributes, including data, management, and/or control packets, e.g., transmitted by an access point or station such as an access point or station that supports the Standard. Memory 924 may store instructions for executing any method mentioned in the present disclosure, input signals, and results of processing of the processor 922, signals to be outputted and the like.

According to an embodiment of the disclosure, the monitoring station 900 is arranged to transmit signals, and the processing circuitry 920 is arranged to prepare the transmitted signal attributes, such as attributes based upon the Standard. Transmitted packets may include management, data, and/or control packets, e.g., based upon the Standard. Memory 924 may store instructions for executing any method mentioned in the present disclosure, input signals, results of processing of the processor 922, signals to be outputted, and/or any other kind of signal.

According to an embodiment of the disclosure, the monitoring station 900 is arranged to receive transmissions of another wireless communication device. The monitoring station 900 (and/or the processing circuitry 920) is arranged to monitor attributes of the received transmissions of the other wireless communication device and determine the attributes of the preamble 307 or 401, header 308, signal field 402, and/or MAC header 305, 404. In addition, according to an embodiment of the disclosure, the monitoring station 900 is arranged to measure the time of arrival of the received transmissions of the other wireless device. In addition, according to an embodiment of the disclosure, the monitoring station 900 is arranged to measure the specific times of the reception of the MAC header of transmissions from another wireless communication device. Processor 922 together with memory 924 may process the information within the preamble 307 or 401, header 308 or signal field 402, and MAC header 305 or 404 so as to determine the attributes of the received packet.

According to an embodiment of the disclosure, the monitoring station 900 may be arranged to transmit packets to another wireless communication device and the processing circuitry 920 may be arranged to prepare the attributes of the packet to be transmitted.

According to an embodiment of the disclosure, general purpose processor 950 may be used to control the operations of the monitoring station 900 and in particular the wireless transmitter receiver 910, e.g., via data bus 970. General purpose processor 950 may also carry out the various calculations as described in this disclosure and may also be used to input various instructions related to the attributes that are to be monitored.

Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 920 may include the memory 924 and a processor 922, the memory 924 containing instructions which, when executed by the processor 922, configure the processor 922 to perform the one or more functions described herein. In addition to a traditional processor and memory, the processing circuitry 920 may comprise integrated circuitry for processing and/or control, e.g. one or more processors and/or processor cores and/or FPGAs (Field Programmable Gate Array) and/or ASICs (Application Specific Integrated Circuitry).

The processing circuitry 920 may include and/or be connected to and/or be configured for accessing (e.g., writing to and/or reading from) the memory 924, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 924 may be configured to store code executable by control circuitry and/or other data, e.g., data pertaining to communication, e.g., configuration and/or address data of nodes, etc. The processing circuitry 920 may be configured to control any of the methods described herein and/or to cause such methods to be performed, e.g., by the processor 922. Corresponding instructions may be stored in the memory 924, which may be readable and/or readably connected to the processing circuitry 920. In other words, the processing circuitry 920 may include a controller, which may comprise a microprocessor and/or microcontroller and/or FPGA (Field-Programmable Gate Array) device and/or ASIC (Application Specific Integrated Circuit) device. It may be considered that the processing circuitry 920 includes or may be connected or connectable to memory, which may be configured to be accessible for reading and/or writing by the controller and/or processing circuitry 920. It is also noted that the elements of the monitoring station 900 can be included in a single physical device/housing or can be distributed among several different physical devices/housings.

Figure 10:
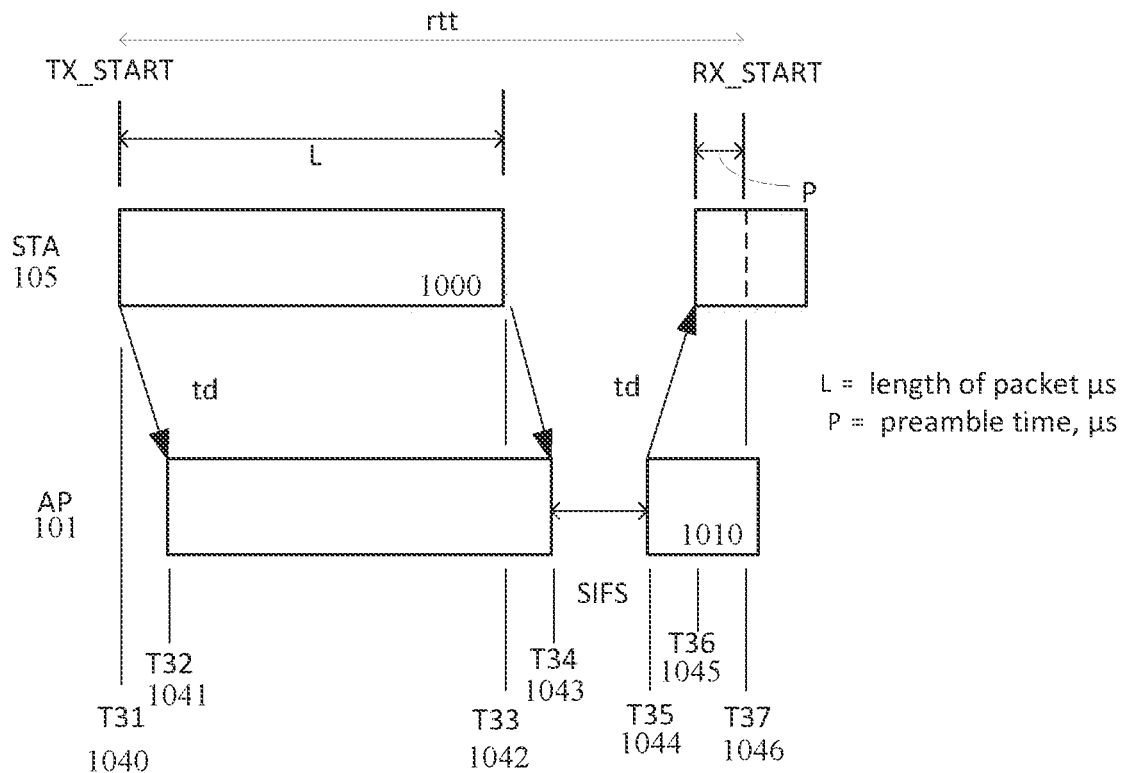
FIG. 10 is a diagram of an example packet transmitted by STA to AP according to the principles of the present disclosure.

FIG. 10 is a diagram of an example, according to an embodiment of the disclosure, of a packet 1000 transmitted by STA 105, to AP 101. Monitoring station 900, according to an embodiment of the disclosure, may be used as STA 105. At time T31 1040, STA 105 starts the transmission of packet 1000. Time T31 1040 is the time recorded as the TX_START time. The packet 1000 may be formed in the baseband 918, and the transmission may be performed via the wireless transmitter 916 under control of the processing circuitry 920 which also records the time of the transmission, TX_START. At time T32 1041, AP 101 starts to receive packet 1000, where (T32−T31)=td, the propagation time due to the distance from STA 105 to AP 101. At time T33 1042, STA 105 stops transmitting packet 1000 and at time T34 1043, AP 101 receives the end of packet 1000, where (T34−T33)=td. Assuming packet 1000 is received correctly, after a nominal time period equal to aSIFSTime (SIFS), at time T35 1044, AP 101 starts to transmit a response packet 1010, e.g., an ACK or a CTS, which starts to arrive at STA 105 at time T36 1045, where (T36−T35)=td. The packet 1000 may be received via antenna 905 and wireless receiver 914 which prepares the received signal for inputting to the baseband 918. At time T37 the preamble, 307 or 401, of packet 1010 has been received at STA 105. The determination that the preamble has been received may be performed by the baseband 918 together with the processing circuitry 920. Time T37 1046 may be recorded, in the memory 924, via processor 922, as the RX_START time. Hence, the measured round trip time, rtt, is recorded as rtt=(RX_START−TX_START)=T37−T31

The length L of packet 1000 (in time) is known by STA 105, and

L=(T33−T31)

And P, the length of the preamble (in time), is also known by STA 105, and

P=(T37−T36)

Hence, rtt=(L+P+SIFS)+2td

The true round trip time, RTT is 2td, the total propagation delay.

RTT=2td=rtt−(L+P+SIFS)　　　(8)

STA 105 measures rtt, and from the details of the packet that was transmitted, knows/determines the values for L, P and SIFS. Therefore, STA 105 may readily determine the RTT, where the determination may be performed by the processing circuitry 920.

For any or all uplink transmissions that solicit an immediate response, such as management frames (e.g., association and authentication frames that expect an ACK response), control frames (e.g., RTS frames that expect a CTS), and data frames that also expect an ACK, STA 105 may measure the rtt and/or determine the RTT as described above with reference to FIG. 10.

Figure 11:
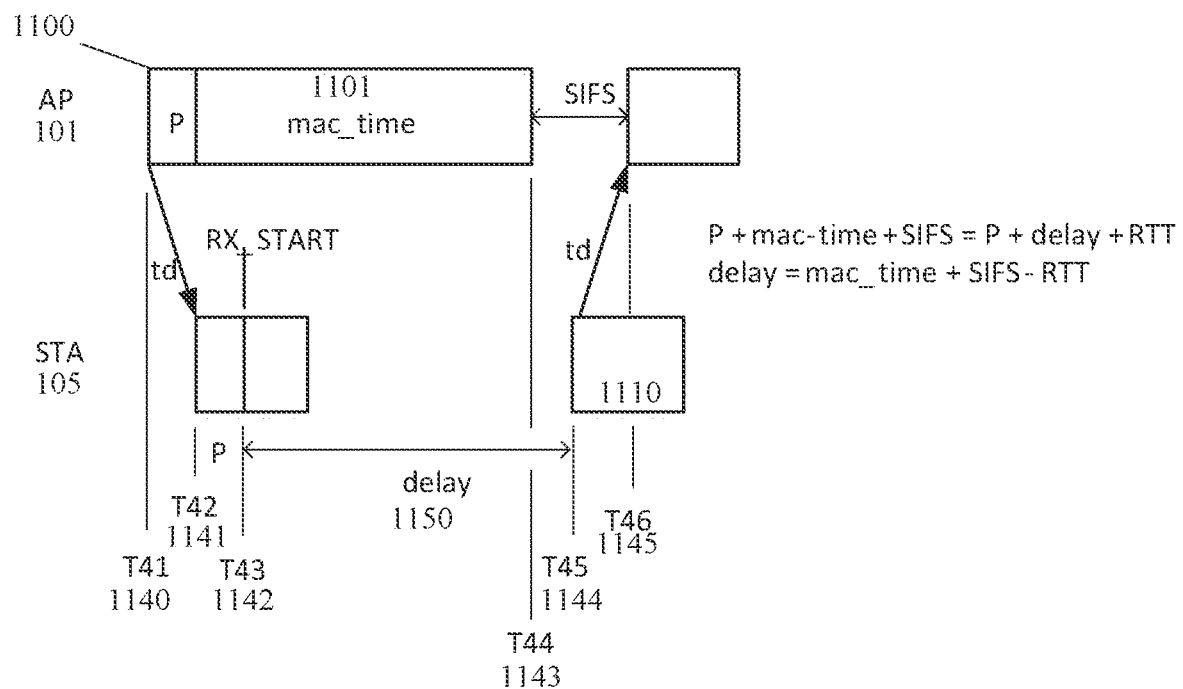
FIG. 11 is a diagram of an example packet transmitted by AP to STA according to the principles of the present disclosure, where an immediate response is expected and where the packet is a retry of a previous packet that was received correctly by STA, but where the propagation time td is such that the response packet, transmitted by STA, arrives too late at AP to prevent a retry.

FIG. 11 is a diagram, according to an embodiment of the disclosure, of an example packet 1100 transmitted by AP 101 to STA 105 where an response within a predetermined time, e.g., an immediate response, is expected and where packet 1100 is a retry of a previous packet that was received correctly by STA 105. In this example, the propagation time td is such that the response packet, if STA 105 waited SIFS before transmitting the response, would arrive too late at AP 101 to prevent a further retry. Monitoring station 900, according to an embodiment of the disclosure, may be used as STA 105. At time T41 1140, AP 101 starts the transmission of packet 1100, i.e., a retry packet, and at time T42 1141, STA 105 (e.g., via wireless receiver 914) starts to receive packet 1100, i.e., the retry packet. The time (T42−T41)=td, the propagation time due to the distance between AP 101 and STA 105. At time T43 1142, STA 105 has received the preamble of retry packet 1100 and records the RX_START time. The packet 1100 may be received via antenna 905, wireless receiver 914 and baseband 918 and the time of the end of the preamble recorded by the processing circuitry 920. STA 105 continues to receive the packet 1100, i.e., the retry packet, up to at least the MAC header, so as to determine that this packet is, indeed, the retry of a previously received packet. As discussed above with reference to FIGS. 3, 4, 7, and 8, STA 105, e.g., via processing circuitry 920, may check that this is the desired retry packet, by examining the contents of the header and/or MAC header. STA 105 can determine that this is the desired retry packet by examination of some or all of the values of the demodulated address field(s), the retry bit, and the sequence number. In addition, STA 105 may determine the length of the packet from the data rate and/or length fields.

Having received the packet up to the MAC header, STA 105, e.g., via processing circuitry 920, may check the relevant fields and/or determine that this packet is the retry packet. STA 105 may also calculate the length of the MAC header, frame body and FCS of the packet, "mac_time" 1101, and calculate a delay 1150 before transmitting (e.g., via wireless transmitter 916 and/or antenna 905) the response packet 1110 at time T45 1144. AP 101 starts to receive the response packet 1110 at time T46 1145. Ideally time T46 1145 is a time equal to SIFS after AP 101 has ended transmission of packet 1100 at time T44 1143. From FIG. 11, the following relationship exists:

$$P+mac\_time+SIFS=td+P+delay+td$$

$$\text{Hence delay}=mac\_time+SIFS-RTT \quad (9)$$

It may be noted from (9), that the preamble time P is not required in order to calculate the delay. Therefore, DSSS and OFDM packets may be similarly handled and the mac_time simply calculated from the relevant length and data rate fields. It may also be noted from (9) that if mac_time+SIFS≤RTT, then "delay" is zero or negative. In this case, "delay" may be set to 0 and the response packet 1110 is transmitted immediately after RX_START:

$$\text{If } mac\_time+SIFS \leq RTT \text{ then delay}=0 \quad (10)$$

If RTT≤SIFS, then from (9) delay≥mac_time. Hence, the entire packet is received before transmitting the response packet, e.g., ACK or CTS. In this case, the response may be sent to the initial received packet and it is not necessary to wait for the retry (assuming that the FCS check is successful). It may also be noted that the "delay" is relative to "mac_time." Therefore, if the length of packet 1100 is shorter than another kind of packet (e.g., packet 1100 may be an RTS packet, which may be shorter than a data packet), then the "delay" corresponding to packet 1100 may also be shorter than a delay correspond to the other kind of packet. Hence, the range of an RTS/CTS exchange is less than that of a data/ACK exchange. The calculation of "delay" may be performed by the processing circuitry 920.

Figure 12:
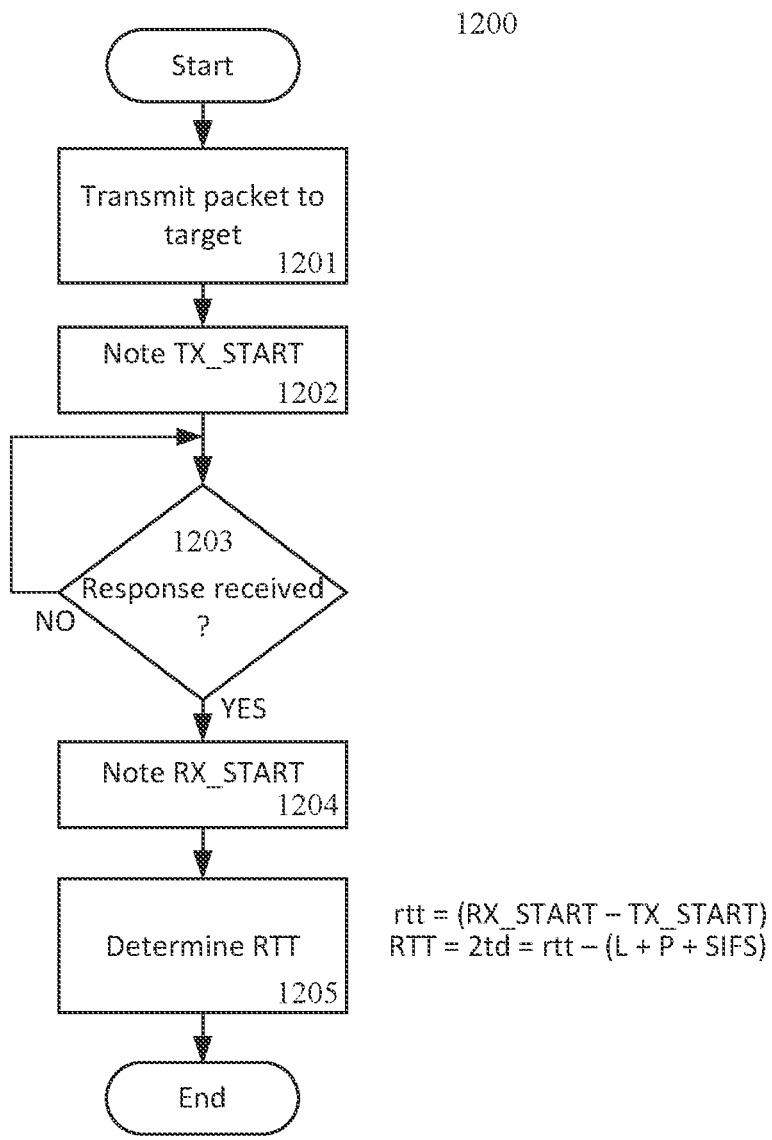
FIG. 12 is an example method performed when transmitting packets from the monitoring station to a distant target device according to the principles of the present disclosure.

FIG. 12 is an example method 1200 that describes an embodiment of the disclosure when transmitting packets from the monitoring station 900 to a distant target device, such as AP 101. At step 1201, the monitoring station 900 transmits a packet to a target device, e.g., AP 101. The packet may be formed in the baseband 918 under instruction from the processing circuitry 920 and/or transmitted via wireless transmitter 916 and antenna 905. The time of the transmission, TX_START, as discussed above with reference to FIG. 10, is noted in step 1202. The time, TX_START, may be stored in memory 924. In step 1203, monitoring station 900 determines that response packet, e.g., ACK or CTS, is received. By observation/inspection of the type and subtype values and the address field, the processing circuitry 920 in monitoring station 900 may confirm that the received packet is the expected response packet, e.g., ACK, CTS. The confirmation of the packet may be performed by the processing circuitry 920 examining the demodulated bits in the baseband 918. In step 1204, the time RX-START may be recorded, as discussed above with reference to FIG. 10. The time, RX_START, may be stored in memory 924. In step 1205, the value for RTT may be calculated as discussed above with reference to equation (8). For every packet transmitted by the monitoring station 900 to the target station, e.g. AP 101, the RTT value can be calculated. If the monitoring station 900 is mobile or airborne, the range to the target station may be varying, and hence the value for RTT may be updated continuously. Smoothing algorithms may be applied relating to the expected variation in RTT. The calculation of RTT and optional application of any smoothing algorithm may be carried out in the processing circuitry 920.

Figure 13:
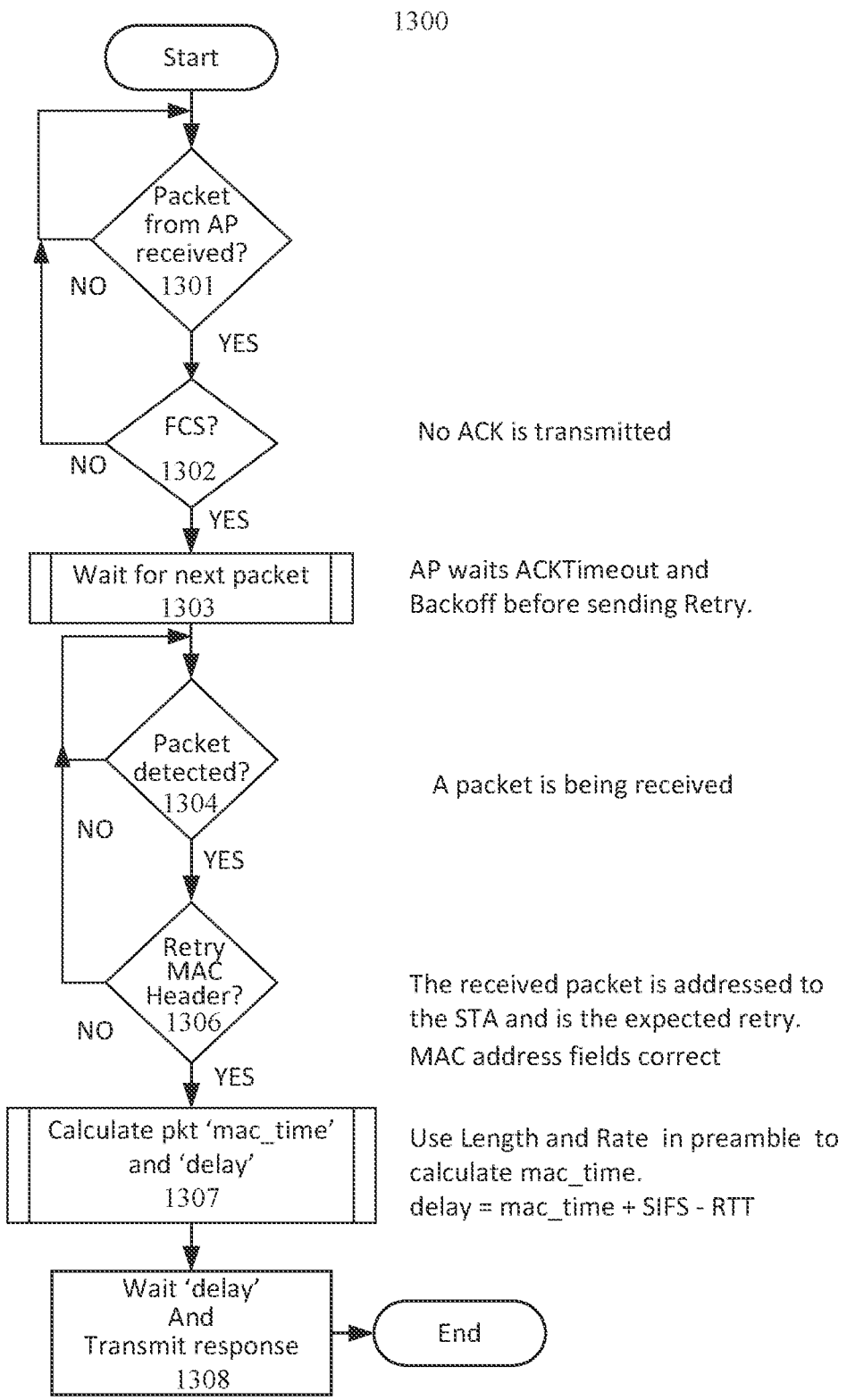
FIG. 13 is an example method performed when a distant target device, such as AP, transmits packets to the monitoring station according to the principles of the present disclosure.

FIG. 13 is an example method 1300 that describes an embodiment of the disclosure when a distant target device, such as AP 101, transmits packets to the monitoring station 900. At step 1301, it is determined that a packet is received from the target device, AP 101. The packet may be received via antenna 905, amplified and down converted via wireless receiver 914 and demodulated in baseband 918. The address fields in the MAC header 305 or 404 may be examined by the processing circuitry 920 in order to determine that the packet is from the target device, AP 101. At step 1302, the FCS of the received packet is checked and if correct, at step 1303, the monitoring station 900 waits for the next packet to be received from the AP 101. As the FCS check was successful, the monitoring station 900 has received the packet correctly. In this nonlimiting example, it is assumed that the distance between the AP 101 and monitoring station 900 is such that a response packet would arrive at the AP 101 too late to prevent a retry. The monitoring station 900 does not transmit a response packet, e.g., an ACK or CTS. Hence, the target device, AP 101, may be expected to transmit a retry packet. At step 1304, a packet may be detected, and at the end of the preamble, 307 or 401, the RX_START time can be noted. At step 1306, it may be checked, by observation of the addresses and retry bit in the MAC header 305 or 404 (e.g., via processing circuitry 920) that the packet is the expected retry packet from the target device, AP 101. If it is not the expected retry packet, then the process returns to step 1304. If, at step 1306, it is determined that the received packet is the expected retry packet, then by observation of the length and rate fields via the processing circuitry 920, the "mac_time" may be calculated. Then, via processing circuitry 920, using equation (9) the "delay" time value may be calculated. At step 1308, after waiting for the "delay" period calculated in step 1307, the response packet, e.g., ACK or CTS, may be transmitted via wireless transmitter 916 and antenna 905.

In some embodiments, the process described in FIG. 13 applies if the RTT is greater than (SIFS+slot time). As discussed above, the shortest possible ACKTimeOut is aSIFSTime+aBackoffSlotTime. Hence, if RTT is equal to or less than aSIFSTime+aBackOffSlotTime, then "delay" may be set to be equal to mac_time. In this case, the entire packet may be received before transmitting the response packet, thereby avoiding a wait for a retry as per steps 1303, 1304 and 1306.

As discussed above with reference to FIGS. 12 and 13, the RTT may be measured for any packet transmitted by the monitoring station 900 to the target station, AP 101, and then the measured RTT may be used to calculate the "delay" required for any packet received from the target station, AP 101, at the monitoring station 900. If the calculated "delay" is equal to or greater than mac_time, then the response packet from the monitoring station 900 to a packet from the target station, AP101, may be sent directly. If the calculated delay is less than a predetermined time, e.g., mac_time, then the response packet from the monitoring station 900, may be sent to a retry packet from the target station, AP101.

Figure 14:
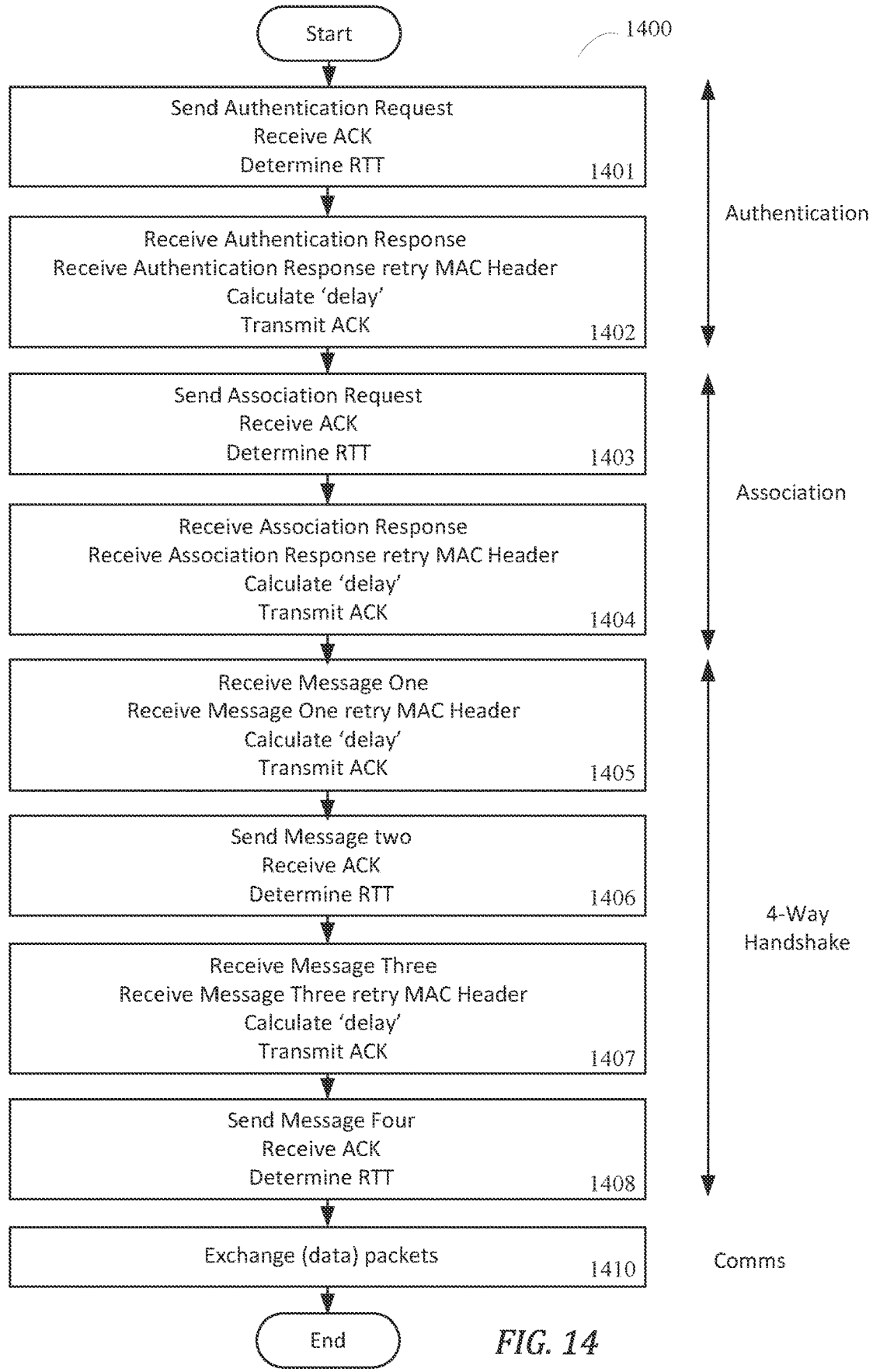
FIG. 14 is an example method that describes long range communications between a STA and an AP according to the principles of the present disclosure.

FIG. 14 is an example 1400 of long-range communications between a STA 105 and an AP 101 that describes an embodiment of the disclosure. According to an embodiment of the disclosure, monitoring station 900 may act as STA 105 and AP 101 may be referred to as the target station. In this example, monitoring station 900, acting as STA 105, first associates with AP 101 prior to exchanging data packets with AP 101. At step 1401, STA 105 transmits, via wireless transmitter 916 and antenna 905, an authentication request packet to AP 101, and AP101 responds with an ACK. As discussed above with reference to FIG. 12, STA 105 calculates, via processing circuitry 920, the RTT with reference to equation (8). At step 1402, STA 105 receives, via the antenna 905 and wireless receiver 914, the authentication response packet transmitted by AP 101. As discussed above with reference to FIG. 13 the initial authentication response packet is received and the details stored. AP 101 then sends a retry and STA105 checks the MAC header, calculates the 'delay' and transmits an ACK at a time equal to 'delay' after the reception of the MAC header as discussed above with reference to FIG. 11. At step 1403, STA 105 transmits, via wireless transmitter 916 and antenna 905, an association request packet to AP 101, and AP101 responds with an ACK. Similar to step 1401, STA 105 calculates, via processing circuitry 920, an updated RTT with reference to equation (8). At step 1404, STA 105 receives the association response packet transmitted by AP 101. Similar to step 1402, the initial association response packet is received and the details stored. AP 101 then sends a retry of the association response packet. STA105 checks the MAC header, calculates the 'delay' using the updated RTT, and transmits an ACK at a time equal to 'delay' after the reception of the preamble.

At step 1405, AP 101 transmits a 'message one' packet, e.g., a packet of a first message, of the four-way handshake, and similar to steps 1402 and 1404, STA 105 stores the details and waits for the retry. AP 101 then sends a retry of the 'message one' packet, and STA105 checks the MAC header, calculates the 'delay' using the updated RTT from step 1404, and transmits an ACK at a time equal to 'delay' after the reception of the preamble. At step 1406, STA 105 transmits the 'message two' packet, e.g., a packet of a second message, of the four-way handshake, waits for the ACK from AP 101, and calculates a new value for RTT using equation (9). At step 1407, AP 101 transmits the 'message three' packet, e.g., a packet of a third message, of the four-way handshake, STA 105 stores the details and waits for the retry. AP 101 then sends a retry of the 'message three' packet. STA105 checks the MAC header, calculates the 'delay' using the RTT from step 1406, and transmits an ACK at a time equal to 'delay' after the reception of the preamble. At step 1408, STA 105 transmits the 'message four' packet, e.g., a packet of a fourth message, of the four-way handshake, waits for the ACK from AP 101, and calculates a new or updated value for RTT using equation (9). As this exchange of packets in steps 1401 to 1408 takes place in a predefined time, the values calculated for RTT in steps 1401, 1403, 1406, and 1408 may be expected to be similar values. After step 1408, STA 105 is associated to AP 101, and at step 1410, an exchanges of packets, such as data packets, may then take place. For any uplink packet, STA 105 may calculate the RTT as discussed above with reference to FIG. 12, and for any downlink packet, STA 105 may calculate 'delay' and/or transmit a response packet, e.g., ACK or CTS, in response to the retried packet from AP 101, as discussed above with reference to FIGS. 11 and 13.

On FIG. 14, steps 1401 to 1408 describe the basic secure association procedure for a Wi-Fi station. In such associations, the AP may transmit RTS packets preceding some of these steps. As discussed above with reference to equation (9), an RTS packet is a short packet, and hence the mac_time has a value corresponding to the short packet. For example, for a 1 Mbps RTS packet, mac_time is 160 µs, and for a 6 Mbps RTS packet, mac_time is 52 µs.

$$delay = mac\_time + SIFS - RTT \qquad (9)$$

Hence, delay=0 when RTT=mac_time+SIFS

For 1 Mbps RTS/CTS, RTT=160+10=170 µs, a range of about 16 miles.

For 6 Mbps RTS/CTS, RTT=52+16=68 µs, a range of about 6.4 miles.

These delay times may be compared to a 100-byte data packet with mac-times of 1424 µs and 240 µs, for 1 Mbps DSSS and 6 Mbps OFDM respectively:

For 1 Mbps, RTT=1424+10=1434 µs, a range of about 135 miles.

For 6 Mbps, RTT=240+16=256 µs, a range of about 24 miles.

If an RTS packet is received, then the CTS response must be sent directly as there is no concept of a 'retry RTS'. After the MAC header, STA 105 may determine that the packet is an RTS addressed to STA 105. Therefore, STA 105 should send the CTS response after waiting "delay" time and not wait for a 'retry'.

The sample range calculations above are for the CTS or ACK responses arriving at the target station exactly SIFS after the end of the transmission. As discussed above, the time that a station may actually wait and accept the response may vary, but at a minimum this is a slot time, 20 µs and 9 µs for DSSS and OFDM respectively. Hence, if (mac_time+

SIFS−RTT)≤0, then delay may be set to zero and the response packet is transmitted immediately after the end of the reception of the MAC header of the received retry packet In the process described in FIG. 14, it may be assumed that the range between the STA 105 and AP 101 is such that RTT≥mac_time+SIFS and that at steps 1402, 1404, 1405, and 1407, STA 105 receives the initial packet and then sends the response packet, i.e., ACK, to the retry packet. As discussed above with reference to equation (10), if the RTTs measured at steps 1401, 1403, 1406 and 1408 are less than or equal to SIFS, then the corresponding delays calculated at steps 1402, 1404, 1405, and 1407 will be greater than mac_time. Hence, the response packet, i.e., ACK, may be sent in response to the initial received packet and it is not required to wait for the retry packet.

Hence, the propagation delay is automatically measured during association and then used to complete the association. Furthermore, the continual calculation of RTT for any uplink packet and the subsequent calculation of "delay" for the downlink packets may be a continuous process and there is no requirement for any "start/stop" control. The process adaptively adjusts by determining the WIT for a subsequent packet, for more than one subsequent packet, or for every subsequent packet, which may be based at least in part on the "delay" calculated during association, Adaptively determining RTT goes to being able to adapt to data rate and/or packet size changes (e.g. for example, the use of RTS/CFS exchanges that may be used before certain 'association' and/or data packets). The adaptive process of association and/or data communications may therefore take place irrespective of the range.

Figure 15:
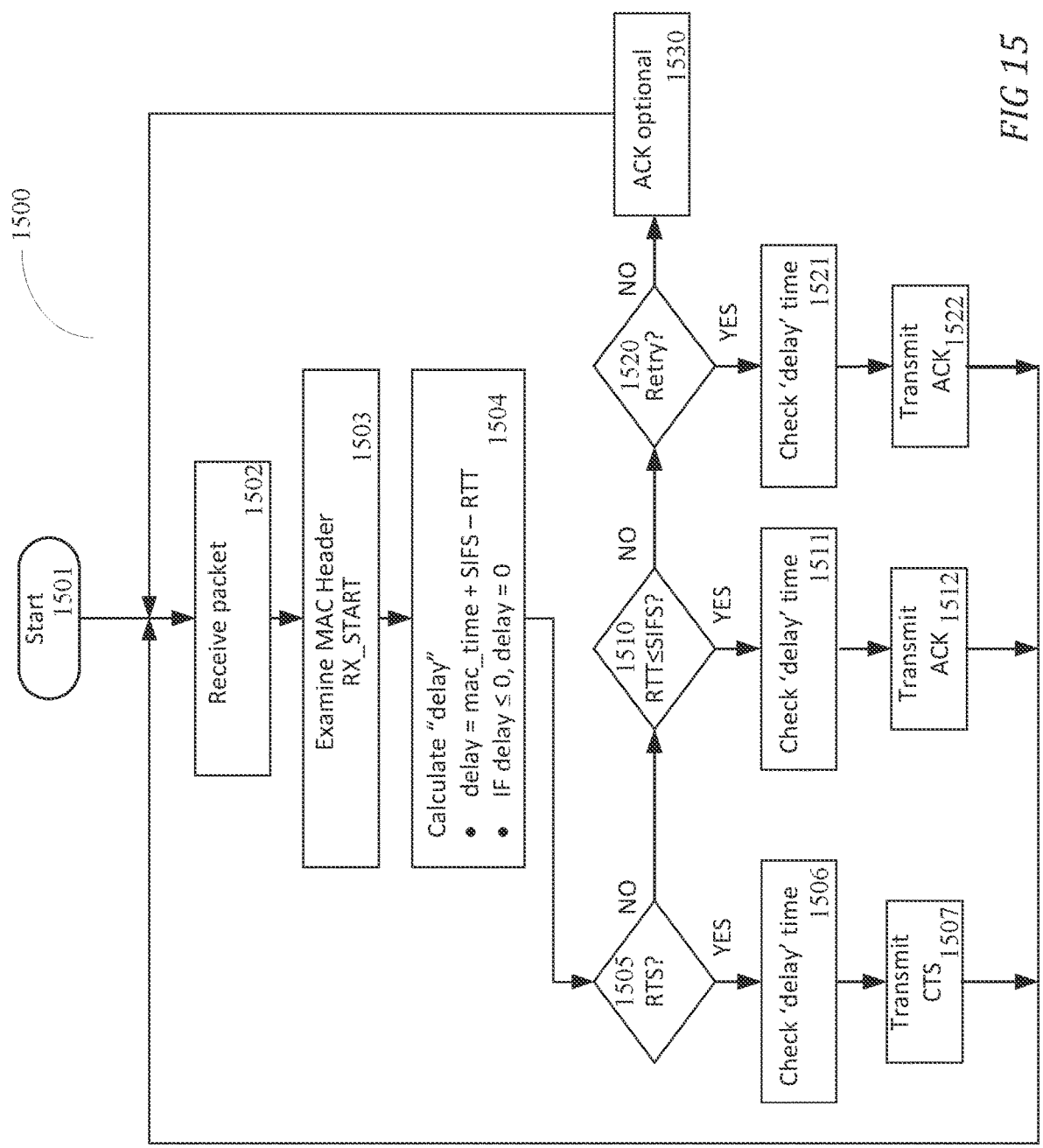
FIG. 15 is an example method that describes a process for downlink packets from the target AP to the monitoring according to the principles of the present disclosure.

FIG. 15 is an example method 1500 that describes a process of an embodiment of this disclosure for downlink packets from the target AP 101 to the monitoring station 900 which may be considered as acting as STA 105. FIG. 15 may be considered as a more complete description of the process than that described in FIG. 13 in that it includes the reception of RTS packets and variations in RTT values. The process may start at step 1501 where, as discussed above with reference to FIG. 12, an RTT value resulting from a previous uplink packet is known. The value of RTT may be stored in memory 924. At step 1502, STA 105 receives a packet. At step 1503, STA 105 has received the MAC header and has determined that the packet is addressed to STA 105. STA 105 may also determine the type of packet, the data rate, and/or length. As discussed above with reference to FIG. 11, RX_START is the time at the end of the preamble and may be noted, in the memory 924 of the processing circuitry 920, for this packet. At step 1504, STA 105 may calculate a value for "delay" using equations (9) and (10) and the known value for RTT. At step 1505, STA 105 may examine the type and/or subtype values of the MAC Header and determine if the received packet is an RTS. If the received packet is an RTS, then at step 1506, the value of "delay" from step 1504 is used to set the transmission time of a CTS response at step 1507. The CTS is transmitted at a time "delay" after RX_START as discussed above with reference to FIG. 11.

If, at step 1505, the packet is determined not to be an RTS, then at step 1510, a check may be made (e.g., via the processing circuitry) to determine if RTT is less than or equal to SIFS. If RTTs is less than or equal to SIFS, then, at step 1511, the value of "delay" from step 1504 is used to set the transmission time of a ACK response at step 1507. The ACK is transmitted at a time "delay" after RX_START, where "delay" will be such that the ACK is transmitted after the reception of the complete packet, including FCS. If at step 1510 it is determined that RTT is greater than SIFS, then at step 1520 a check may be carried out to determine if the packet is a retry of a previous packet from AP 101 that had been successfully received by STA 105. If it is not such a retry, then at step 1530 an ACK may be optionally transmitted, but it may be assumed that the range is too far for the ACK to be received in time at AP 101. At step 1535, the details of the packet, assuming the FCS check was successful, may be saved. At step 1520, if the received packet is determined to be a retry of a successful previous packet from AP 101 (e.g., that had been received by STA 105 and saved at step 1535), then, at step 1521, the value of "delay" from step 1504 is used to set the transmission time of a ACK response at step 1522. The ACK is transmitted at a time "delay" after RX_START as discussed above with reference to FIG. 11.

Figure 16:
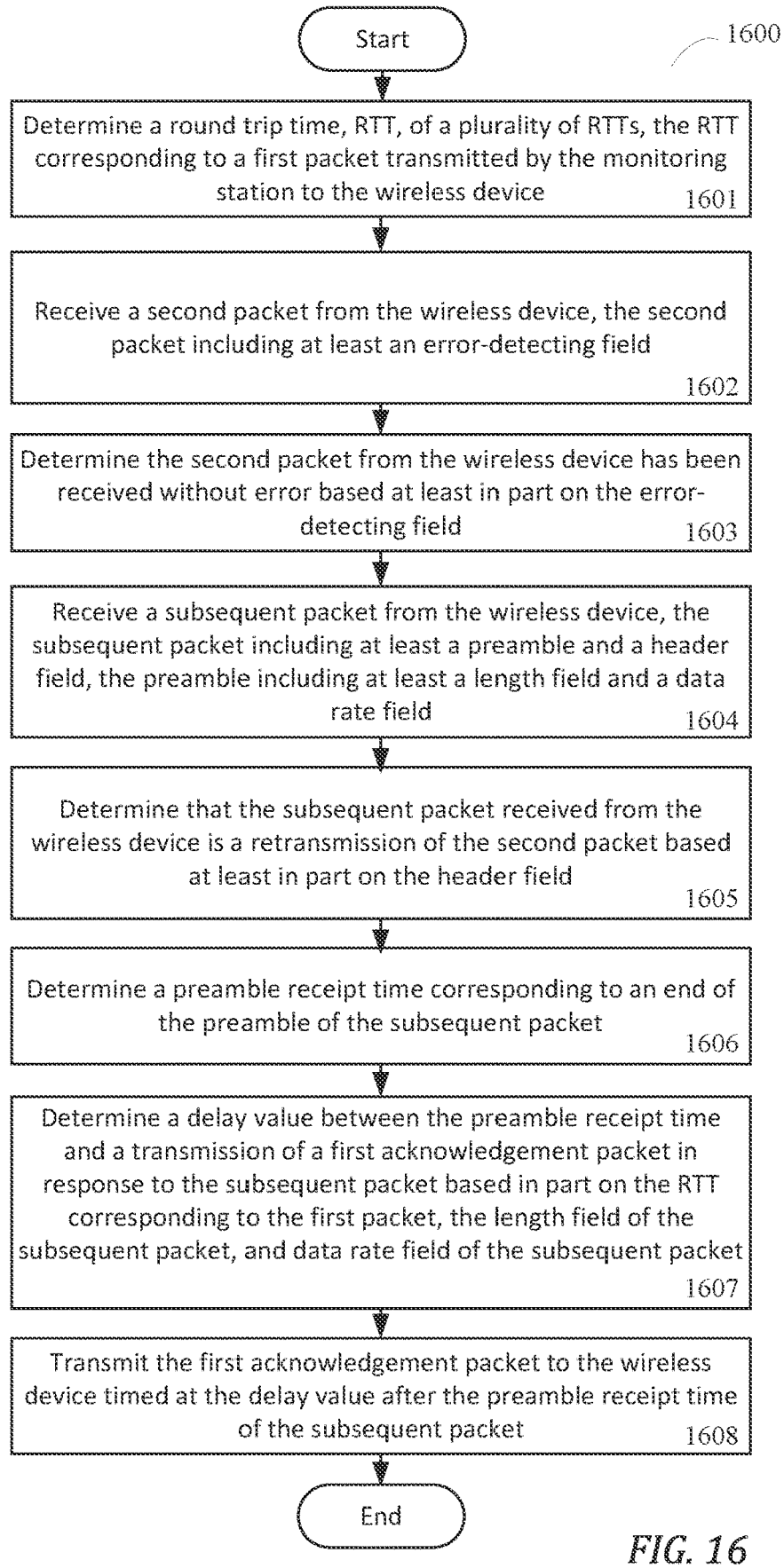
FIG. 16 is another example method that describes a process of communication between a monitoring station and a wireless device.

FIG. 16 is a flowchart of another example method in a monitoring station. In the example of FIG. 16, the monitoring station is configured for communication between the monitoring station and a wireless device. Any one of the steps described herein may be performed by any one of the components of monitoring station 900, e.g., one or more antennas 905, radio frequency (RF) front end 912, wireless receiver 914, wireless transmitter 916, baseband 918, and processing circuitry 920 including processor 922 and memory 924. The process includes determining (Step 1601), e.g., via processing circuitry 920, a round trip time, RTT, of a plurality of RTTs, the RTT corresponding to a first packet transmitted by the monitoring station to the wireless device; receiving (Step 1602), e.g., via processing circuitry 920 and/or RF front end 912, a second packet from the wireless device, where the second packet includes at least an error-detecting field; determining (Step 1603) e.g., via processing circuitry 920, the second packet from the wireless device has been received without error based at least in part on the error-detecting field; and receiving (Step 1604), e.g., via processing circuitry 920 and/or RF front end 912, a subsequent packet from the wireless device, where the subsequent packet includes at least a preamble and a header field, and the preamble includes at least a length field and a data rate field. The method further includes determining (Step 1605), e.g., via processing circuitry 920, that the subsequent packet received from the wireless device is a retransmission of the second packet based at least in part on the header field; determining (Step 1606), e.g., via processing circuitry 920, a preamble receipt time corresponding to an end of the preamble of the subsequent packet; determining (Step 1607), e.g., via processing circuitry 920, a delay value between the preamble receipt time and a transmission of a first acknowledgement packet in response to the subsequent packet based in part on the RTT corresponding to the first packet, the length field of the subsequent packet, and data rate field of the subsequent packet. The first acknowledgement packet is transmitted (Step 1608), e.g., via processing circuitry 920 and/or RF front end 912, to the wireless device timed at the delay value after the preamble receipt time of the subsequent packet.

In some embodiments, the first packet transmitted by the monitoring station to the wireless device is any one of an authentication request, an association request, and one handshake message of a plurality of handshake messages. The second packet is received in response to the first packet and is one of an authentication response, an association response, and another handshake message of the plurality of handshake messages.

In some other embodiments, the method further includes exchanging a plurality of data packets with the wireless device after the monitoring station completes an association with the wireless device, where the plurality of data packets includes at least one uplink data packet and one subsequent downlink data packet. The delay value is dynamically adjusted by determining another RTT of the plurality of RTTs for each uplink data packet of the plurality of data packets, The other RTT is used for the determination of the delay value of the subsequent packet, and the subsequent packet is the subsequent downlink data packet.

In one embodiment, the delay value is a first delay value. After receiving the second packet from the wireless device, if the received second packet is a request-to-send, RTS, packet, the method further includes determining another preamble receipt time, where the other preamble receipt time is an RX_START time corresponding to an end of a preamble of the RTS packet; determining a second delay value based at least in part on the RTT corresponding to the first packet, a length field of the RTS packet and a data rate field of the RTS packet; and transmitting a second acknowledgement packet to the wireless device timed at the delay value after the RX-START time corresponding to the end of the preamble of the RTS packet. The second acknowledgement packet is a clear-to-send, CTS, packet.

In another embodiment, the delay value is further based on a Short Interframe Space, SIFS, between and end of a transmission of the subsequent packet and a start of a reception of a corresponding acknowledgement packet. The method further includes, if the second packet from the wireless device is not the RTS packet and the RTT is one of equal to and greater than the SIFS, determining a third delay value to transmit a third acknowledgement packet to the wireless device after an end of the second packet including the at least the error-detecting field, and transmitting the third acknowledgement packet.

In some embodiments, if the subsequent packet being received from the wireless device is not the retransmission of the second packet, a fourth acknowledgement packet is transmitted in response to the subsequent data packet after a time equal to a Short Interframe Space, SIFS, has elapsed from an end of reception of the subsequent data packet.

In some other embodiments, the RTT is determined as: RTT=(RX_START−TX_START)−SIFS−L, where RX_START is a time corresponding to an end of a preamble of another packet received in response to the first packet transmitted by the monitoring station, TX_START is a time that the first packet was transmitted by the monitoring station, SIFS is an aSIFSTime, and L is a time corresponding to a total packet length.

In one embodiment, the delay value is determined as: delay=mac_time+SIFS−RTT, where mac_time is a time corresponding to a frame body and an error-detection field of the subsequent packet. The mac_time is calculated based at least in part on the length field of the subsequent packet and the data rate field of the subsequent packet, SIFS is an aSIFSTime, and RTT is the RTT.

In another embodiment, the error-detecting field is a Frame Check Sum, FCS, field, and the preamble receipt time is an RX_START time corresponding to the end of the preamble of the subsequent packet received from the wireless device.

In some embodiments, the wireless device is an Access Point configured at least for any one of an authentication of the wireless device, an association to the wireless device, a handshake process, and an exchange of data packets with the wireless device.

The following is a nonlimiting list of additional embodiments according to the principles of the present disclosure:

1. A method for communications between a monitoring station and a wireless device, the method comprising:
  determining the round trip time RTT for a packet sent by the monitoring station to the wireless device;
  receiving at the monitoring station a first packet from the wireless device;
  determining that receipt of a first data packet at the monitoring station from the wireless device has been received without error;
  receiving a subsequent data packet at the monitoring station from the wireless device;
  determining that the subsequent data packet being received from the wireless device is a retransmission of the first data packet;
  noting an RX_START time corresponding to the end of the preamble;
  calculating a 'delay' value based in part on the round trip time, RTT, the length, and data rate of the received packet;
  transmitting a first acknowledgement to the wireless device timed at 'delay' value after RX-START.

2. The method of Embodiment 1, wherein the wireless device is an Access Point and when a monitoring station is associated to the wireless device, and for subsequent exchange(s) of data, the RTT is determined for every uplink packet and then used in the calculation of the 'delay' for each subsequent downlink packet.

3. The method of Embodiment 1, wherein after receiving at the monitoring station a first packet from the wireless device, if the received packet is a request-to-send, RTS packet:
  noting an RX_START time corresponding to the end of the preamble;
  calculating a second 'delay' value based in part on the round trip time, RTT, the length and data rate of the received RTS packet;
  transmitting a clear-to-send, CTS, packet to the wireless device timed at 'delay' value after RX-START.

4. The method of Embodiment 1, wherein the round trip time RTT is determined as follows:

RTT=(RX_START−TX_START)−SIFS−L, where:

RX_START is the time corresponding to the end of the preamble of the received response packet to the packet transmitted by the monitoring station,
TX_START is the time that the packet was transmitted by the monitoring station,
SIFS is the aSIFSTime as per the 802.11 Standard, and
L is time of the total packet length.

5. The method of Embodiment 1, wherein the 'delay' time is determined as follows:

delay=mac_time+SIFS−RTT, where:

mac_time is the time of the frame body and frame check sum, FCS, field of the received packet calculated from the length and data rate of the received packet.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (which when programmed as described herein forms a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the use of other specific points within the received packet as the timing trigger, the use of one or more wireless devices to process the delay, the use of one or more wireless devices to transmit the ACK that is sent before the received packet has completed, the calculation and value of delay, the method of estimating the delay. Accordingly, the scope should be determined not solely by the embodiments illustrated.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method in a monitoring station configured for communication with a wireless device, the method comprising:
    determining a round trip time, RTT, of a plurality of RTTs, the RTT corresponding to a first packet transmitted by the monitoring station to the wireless device;
    receiving a second packet from the wireless device, the second packet including at least an error-detecting field;
    determining the second packet from the wireless device has been received without error based at least in part on the error-detecting field;
    receiving a subsequent packet from the wireless device, the subsequent packet including at least a preamble and a header field, the preamble including at least a length field and a data rate field;
    determining that the subsequent packet received from the wireless device is a retransmission of the second packet based at least in part on the header field;
    determining a preamble receipt time corresponding to an end of the preamble of the subsequent packet;
    determining a delay value between the preamble receipt time and a transmission of a first acknowledgement packet in response to the subsequent packet, the delay value being determined as:
    delay=mac_time+SIFS−RTT;
        mac_time being a time corresponding to a frame body and an error-detection field of the subsequent packet, the mac_time being calculated based at least in part on the length field of the subsequent packet and the data rate field of the subsequent packet;
        SIFS being an aSIFSTime; and
    transmitting the first acknowledgement packet to the wireless device timed at the delay value after the preamble receipt time of the subsequent packet.

2. The method of claim 1, wherein the first packet transmitted by the monitoring station to the wireless device is any one of:
    an authentication request;
    an association request; and
    one handshake message of a plurality of handshake messages; and
    the second packet is received in response to the first packet and is one of:
        an authentication response;
        an association response; and
        another handshake message of the plurality of handshake messages.

3. The method of claim 2, the method further including:
    exchanging a plurality of data packets with the wireless device after the monitoring station completes an association with the wireless device, the plurality of data packets including at least one uplink data packet and one subsequent downlink data packet; and dynamically adjusting the delay value by determining another RTT of the plurality of RTTs for each uplink data packet of the plurality of data packets, the other RTT being used for the determination of the delay value of the subsequent packet, the subsequent packet being the subsequent downlink data packet.

4. The method of claim 1, wherein the delay value is a first delay value, and after receiving the second packet from the wireless device, if the received second packet is a request-to-send, RTS, packet:

determining another preamble receipt time, the other preamble receipt time being an RX_START time corresponding to an end of a preamble of the RTS packet;

determining a second delay value based at least in part on the RTT corresponding to the first packet, a length field of the RTS packet and a data rate field of the RTS packet; and transmitting a second acknowledgement packet to the wireless device timed at the delay value after the RX-START time corresponding to the end of the preamble of the RTS packet, the second acknowledgement packet being a clear-to-send, CTS, packet.

5. The method of claim 4, wherein the delay value is further based on a Short Interframe Space, SIFS, between and end of a transmission of the subsequent packet and a start of a reception of a corresponding acknowledgement packet; and if the second packet from the wireless device is not the RTS packet and the RTT is one of equal to and greater than the SIFS:

determining a third delay value to transmit a third acknowledgement packet to the wireless device after an end of the second packet including the at least the error-detecting field; and transmitting the third acknowledgement packet.

6. The method of claim 5, wherein if the subsequent packet being received from the wireless device is not the retransmission of the second packet:

transmitting a fourth acknowledgement packet in response to the subsequent data packet after a time equal to a Short Interframe Space, SIFS, has elapsed from an end of reception of the subsequent data packet.

7. The method of claim 1, wherein the RTT is determined as:

$$RTT=(RX\_START-TX\_START)-SIFS-L-P,$$

where RX_START is a time corresponding to an end of a preamble of another packet received in response to the first packet transmitted by the monitoring station, TX_START is a time that the first packet was transmitted by the monitoring station, SIFS is an aSIFSTime, L is a time corresponding to a total packet length, and P is a length of the preamble.

8. The method of claim 1, wherein the error-detecting field is a Frame Check Sum, FCS, field, and the preamble receipt time is an RX_START time corresponding to the end of the preamble of the subsequent packet received from the wireless device.

9. The method of claim 1, wherein the wireless device is an Access Point configured at least for any one of an authentication of the wireless device, an association to the wireless device, a handshake process, and an exchange of data packets with the wireless device.

10. A monitoring station configured for communication with a wireless device, the monitoring station comprising processing circuitry configured to:

determine a round trip time, RTT, of a plurality of RTTs, the RTT corresponding to a first packet transmitted by the monitoring station to the wireless device;

cause the monitoring station to receive a second packet from the wireless device, the second packet including at least an error-detecting field;

determine the second packet from the wireless device has been received without error based at least in part on the error-detecting field;

cause the monitoring station to receive a subsequent packet from the wireless device, the subsequent packet including at least a preamble and a header field, the preamble including at least a length field and a data rate field;

determine that the subsequent packet received from the wireless device is a retransmission of the second packet based at least in part on the header field;

determine a preamble receipt time corresponding to an end of the preamble of the subsequent packet;

determine a delay value between the preamble receipt time and a transmission of a first acknowledgement packet in response to the subsequent packet, the delay value being determined as:

delay=mac_time+SIFS−RTT;

mac_time being a time corresponding to a frame body and an error-detection field of the subsequent packet, the mac_time being calculated based at least in part on the length field of the subsequent packet and the data rate field of the subsequent packet;

SIFS being an aSIFSTime; and cause the monitoring station to transmit the first acknowledgement packet to the wireless device timed at the delay value after the preamble receipt time of the subsequent packet.

11. The monitoring station of claim 10, wherein the first packet transmitted by the monitoring station to the wireless device is any one of:

an authentication request;

an association request; and one handshake message of a plurality of handshake messages; and the second packet is received in response to the first packet and is one of:

an authentication response;

an association response; and another handshake message of the plurality of handshake messages.

12. The monitoring station of claim 11, the processing circuitry being further configured to:

cause the monitoring station to exchange a plurality of data packets with the wireless device after the monitoring station completes an association with the wireless device, the plurality of data packets including at least one uplink data packet and one subsequent downlink data packet; and dynamically adjust the delay value by determining another RTT of the plurality of RTTs for each uplink data packet of the plurality of data packets, the other RTT being used for the determination of the delay value of the subsequent packet, the subsequent packet being the subsequent downlink data packet.

13. The monitoring station of claim 10, wherein the delay value is a first delay value, and the processing circuitry is further configured to:

after receiving the second packet from the wireless device, if the received second packet is a request-to-send, RTS, packet:
    determine another preamble receipt time, the other preamble receipt time being an RX_START time corresponding to an end of a preamble of the RTS packet;
    determine a second delay value based at least in part on the RTT corresponding to the first packet, a length field of the RTS packet and a data rate field of the RTS packet; and
    cause the monitoring station to transmit a second acknowledgement packet to the wireless device timed at the delay value after the RX-START time corresponding to the end of the preamble of the RTS packet, the second acknowledgement packet being a clear-to-send, CTS, packet.

14. The monitoring station of claim 13, wherein the delay value is further based on a Short Interframe Space, SIFS, between and end of a transmission of the subsequent packet and a start of a reception of a corresponding acknowledgement packet; and
the processing circuitry is further configured to:
    if the second packet from the wireless device is not the RTS packet and the RTT is one of equal to and greater than the SIFS:
        determine a third delay value to transmit a third acknowledgement packet to the wireless device after an end of the second packet including the at least the error-detecting field; and
        cause the monitoring station to transmit the third acknowledgement packet.

15. The monitoring station of claim 14, wherein the processing circuitry is further configured to:
    if the subsequent packet being received from the wireless device is not the retransmission of the second packet:
        cause the monitoring station to transmit a fourth acknowledgement packet in response to the subsequent data packet after a time equal to a Short Interframe Space, SIFS, has elapsed from an end of reception of the subsequent data packet.

16. The monitoring station of claim 10, wherein the RTT is determined as:

$$RTT = (RX\_START - TX\_START) - SIFS - L - P,$$

where RX_START is a time corresponding to an end of a preamble of another packet received in response to the first packet transmitted by the monitoring station,
TX_START is a time that the first packet was transmitted by the monitoring station,
SIFS is an aSIFSTime,
L is a time corresponding to a total packet length, and
P is a length of the preamble.

17. The monitoring station of claim 10, wherein the error-detecting field is a Frame Check Sum, FCS, field, and the preamble receipt time is an RX_START time corresponding to the end of the preamble of the subsequent packet received from the wireless device.

18. The monitoring station of claim 10, wherein the wireless device is an Access Point configured at least for any one of an authentication of the wireless device, an association to the wireless device, a handshake process, and an exchange of data packets with the wireless device.

\* \* \* \* \*